(12) United States Patent
Yao et al.

(10) Patent No.: US 11,886,696 B2
(45) Date of Patent: Jan. 30, 2024

(54) APPLICATION HOTSPOT ON ENDPOINT DEVICE

(71) Applicant: Citrix Systems, Inc., Fort Lauderdale, FL (US)

(72) Inventors: Peng Yao, Nanjing (CN); Tianyu Xiao, Nanjing (CN); Yang Wang, Nanjing (CN)

(*) Notice: Subject to any disclaimer, the term of this patent is extended or adjusted under 35 U.S.C. 154(b) by 11 days.

(21) Appl. No.: 17/676,971

(22) Filed: Feb. 22, 2022

(65) Prior Publication Data

US 2023/0185443 A1  Jun. 15, 2023

Related U.S. Application Data

(63) Continuation of application No. PCT/CN2021/138313, filed on Dec. 15, 2021.

(51) Int. Cl.
| | |
|---|---|
| G06F 3/048 | (2013.01) |
| G06F 9/451 | (2018.01) |
| G06F 3/03 | (2006.01) |
| G06F 3/0487 | (2013.01) |
| G06F 3/04817 | (2022.01) |
| G06F 3/0485 | (2022.01) |

(52) U.S. Cl.
CPC ............. *G06F 3/0487* (2013.01); *G06F 3/03* (2013.01); *G06F 3/0485* (2013.01); *G06F 3/04817* (2013.01); *G06F 9/451* (2018.02)

(58) Field of Classification Search
CPC .. G06F 3/0487; G06F 3/0488; G06F 3/04812; G06F 3/0484; G06F 3/0485; G06F 3/04817; G06F 3/03; G06F 9/451; G06F 9/452; G06F 2203/04806
See application file for complete search history.

(56) References Cited

U.S. PATENT DOCUMENTS

| | | | |
|---|---|---|---|
| 8,149,249 B1 | 4/2012 | Oplinger | |
| 8,745,525 B1 | 6/2014 | Roskind | |
| 8,832,588 B1 | 9/2014 | Kerzner et al. | |
| 10,600,139 B2* | 3/2020 | Angorn | ................. H04W 4/12 |
| 11,557,266 B2* | 1/2023 | Harwell | .................. G09G 5/06 |

(Continued)

FOREIGN PATENT DOCUMENTS

| | | |
|---|---|---|
| EP | 1942401 A1 | 7/2008 |
| EP | 2657837 A1 | 10/2013 |
| WO | 2014189910 A1 | 11/2014 |

OTHER PUBLICATIONS

International Search Report, dated Jul. 29, 2014, International Application No. PCT/US2014/038763, 11 pages.

(Continued)

*Primary Examiner* — Vijay Shankar

(57) ABSTRACT

Methods, systems, and computer-readable media for providing application hotspots on an endpoint device are presented. A computing device may provide an endpoint device with access to a remote application. The remote application may be hosted on the computing device and displayable on the endpoint device in a form of a user interface. The computing device determine an adjustment to the user interface based on coordinates of a feature of user interface and a screen size of the endpoint device. The computing device may provide data to the endpoint device to render the user interface thereon. The user interface may include an element different than the feature and configured to initiate the determined adjustment to the user interface.

20 Claims, 16 Drawing Sheets

(56) References Cited

U.S. PATENT DOCUMENTS

| | | | |
|---|---|---|---|
| 2005/0177783 A1 | 8/2005 | Agrawala et al. | |
| 2007/0198950 A1 | 8/2007 | Dodge et al. | |
| 2008/0094368 A1 | 4/2008 | Ording et al. | |
| 2010/0269152 A1 | 10/2010 | Pahlavan et al. | |
| 2012/0084663 A1 | 4/2012 | Momchilov et al. | |
| 2012/0151372 A1 | 6/2012 | Kominac et al. | |
| 2012/0159402 A1 | 6/2012 | Nurmi et al. | |
| 2012/0218468 A1 | 8/2012 | Tan et al. | |
| 2012/0296959 A1 | 11/2012 | Momchilov et al. | |
| 2013/0021380 A1 | 1/2013 | Park | |
| 2013/0091543 A1 | 4/2013 | Wade et al. | |
| 2013/0097550 A1 | 4/2013 | Grossman et al. | |
| 2013/0139103 A1 | 5/2013 | Laborczfalvi et al. | |
| 2013/0181902 A1 | 7/2013 | Hinckley et al. | |
| 2013/0219338 A1 | 8/2013 | VanBlon et al. | |
| 2013/0290856 A1 | 10/2013 | Beveridge et al. | |
| 2014/0109004 A1 | 4/2014 | Sadhvani et al. | |
| 2014/0247208 A1* | 9/2014 | Henderek | G06F 3/017 345/156 |
| 2014/0289816 A1 | 9/2014 | Mazzaferri et al. | |
| 2015/0121183 A1 | 4/2015 | Saund et al. | |
| 2017/0351537 A1 | 12/2017 | AbiEzzi et al. | |
| 2019/0079640 A1 | 3/2019 | Page et al. | |
| 2020/0336718 A1* | 10/2020 | Yoon | G06F 3/0488 |
| 2021/0353886 A1* | 11/2021 | Shankaranarayana | G06F 3/04817 |

OTHER PUBLICATIONS

Dec. 14, 2015—U.S. Non-final Office Action—U.S. Appl. No. 13/960,740.
Aug. 25, 2016—U.S. Final Office Action—U.S. Appl. No. 13/960,740.
Feb. 9, 2016—U.S. Non-final Office Action—U.S. Appl. No. 13/960,740.
Sep. 25, 2017—U.S. Final Office Action—U.S. Appl. No. 13/960,740.
May 14, 2018—U.S. Non-final Office Action—U.S. Appl. No. 13/960,740.
Dec. 13, 2018—U.S. Final Office Action—U.S. Appl. No. 13/960,740.
Oct. 4, 2019—U.S. Notice of Allowance—U.S. Appl. No. 13/960,740.
Oct. 7, 2020—U.S. Non-final Office Action—U.S. Appl. No. 16/733,962.
Jul. 8, 2021—U.S. Final Office Action—U.S. Appl. No. 16/733,962.
Jul. 16, 2021 (WO) International Search Report and Written Opinion—App. PCT/CN2020/138670.
Sep. 14, 2021 U.S. Non-Final Office Action—U.S. Appl. No. 17/181,811.
Apr. 27, 2022—U.S. Final Office Action—U.S. Appl. No. 17/181,811.
Mar. 22, 2022—U.S. Non-Final Office Action—U.S. Appl. No. 16/733,962.
May 25, 2022 (WO) International Search Report and Written Opinion—App. PCT/CN2021/138313.

\* cited by examiner

APPLICATION HOTSPOT ON ENDPOINT DEVICE

CROSS-REFERENCE TO RELATED APPLICATIONS

This application is a bypass continuation of PCT/CN2021/138313 filed on Dec. 15, 2021, and having the same title.

FIELD

Aspects described herein generally relate to computer networking, remote computer access, virtualization, enterprise mobility management, and hardware and software related thereto. More specifically, one or more aspects relate to computer hardware and software for application hotspots on endpoint devices.

BACKGROUND

Enterprises are increasingly adopting remote applications or desktops to enable employees to access resources in an enterprise network from their local endpoint devices. Virtual desktops generated by a virtual desktop application may be viewed locally on an endpoint device such that the virtual desktop appears to be the native desktop on the endpoint device. A remote server may execute an application, and render the user interface for the application on the virtual desktop. An enterprise user may then interact with the remote application via the user interface displayed on the virtual desktop from anywhere and via a variety of endpoint devices.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

Because a remote application might not have the characteristics or similar visual appearance of the layout of an endpoint device, displaying remote applications on endpoint devices may result in a poor user experience. For example, various endpoint devices may have different screen dimensions and resolutions. In remoting an image of an application to an endpoint device, a remote application might not be presented with a consistent image across multiple endpoint devices. Indeed, due to the limits in the size or dimension of the screen, certain endpoint devices may initially display an image of the application that is either too small, or certain elements (e.g., a search bar, a close button) of the application may be entirely or partially obscured from a screen of the endpoint device, such that it may be necessary to manually adjust the size or location of the application elements. As remote applications and desktops are more frequently adopted and used, it is increasingly important to improve device performance, efficiency and consistency to provide an optimal user experience on a variety of different devices.

To overcome the limitations described above, and to overcome other limitations that will be apparent upon reading and understanding the present specification, aspects described herein are directed toward enhancing remote applications and desktop experiences on endpoint devices, for example, by providing application hotspots on an endpoint device (e.g., a mobile device).

In accordance with one or more embodiments, a computing device having at least one processor and memory may receive, from an endpoint device, a request to connect to a remote application. The computing device may determine one or more hotspot areas associated with the remote application. For example, a hotspot area, or just hotspot, may correspond to a User Interface (UI) element (e.g., a search bar, or a close button) or a region in the remote application that a user frequently uses, references, or needs to effectively interact with the remote application. In some instances, the computing device may generate a floating menu bar on the remote session. An icon representing a shortcut to the hotspot may be displayed on the floating menu bar. The user may tap or click on the icon on the floating menu bar to cause the corresponding hotspot region to be prominently displayed. Based on a resolution of a screen of the endpoint device, the computing device may determine coordinates associated with the one or more hotspots. The coordinates may be representative of locations of the hotspots in a canvas on which to display an image of the remote application on the screen of the endpoint device. The computing device may provide the image of the remote application to the endpoint device. The image of the remote application may include one or more hotspots displayed based on their corresponding coordinates.

More particularly, and as will be described further herein, the endpoint device may receive a triggering event associated with the one or more hotspots on an image of the remote application. The computing device may send information to the endpoint device in response to the triggering event to enable adjustment of a size or location of a particular hotspot. The adjustment may be related to a zoom in operation or a zoom out operation on the hotspot. The adjustment may be related to changing a location of the hotspot.

In many aspects, the computing device may determine coordinate differences between a particular hotspot and a center of the screen of the endpoint device. The computing device may provide information to move the particular hotspot to the center of the screen based on the coordinate differences. The computing device may determine a first coordinates associated with a particular hotspot, and a second coordinates associated with a center of the screen of the endpoint device. The computing device may determine there is not adequate space to move the particular hotspot to the center of the screen. The computing device may provide information to move the particular hotspot based on a move offset, and the move offset may be indicative of a minimal distance between the first coordinates and the second coordinates.

In many aspects, one or more icons may be displayed on a floating menu bar within the image of the remote application. The one or more icons may represent shortcuts to the one or more hotspots. Prior to determining the one or more hotspots associated with the remote application, the computing device may register one or more elements associated with the remote application as hotspots based on, for example, a frequency of access associated with each element. The one or more elements may include a UI element (e.g., a close button). The user may interact with the UI element to generate a triggering event such as a click operation or a tap operation on the image of the remote application.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed toward enhancing remote application and desktop experiences on endpoint devices, for example, by providing application hotspots on an endpoint device (e.g., a mobile device). As discussed previously, in accessing an application (e.g., a remote application) from an endpoint device, the display of the application might not fit or may be improperly sized for display on a screen of the endpoint device. For example, a size, dimension or location of certain elements of an application (e.g., a search bar or a close button) may be too small or may be obscured by other portions of the interface. As a result, users of the endpoint device may need to manually adjust settings of the display or browser window which may be tedious and time-consuming to the user.

The disclosure herein improves the functioning of computing devices, and in particular the process of remoting a desktop image or application content to a client endpoint device, by providing shortcuts to the application hotspots in the consistent and convenient locations for quick access to certain elements of the application in a canvas that renders an image of the remote application (e.g., of the endpoint device) to facilitate operations and improve user experience. The process described herein allows endpoint devices to display a virtual desktop in a manner which avoids cumbersome display adjustment steps. Accordingly, the process described herein improves the functioning of computing devices when using a remote presentation session while also making those computing devices easier to use.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," "positioned," and similar terms, is meant to include both direct and indirect connecting, coupling, and positioning.

Computing Architecture

Figure 1:
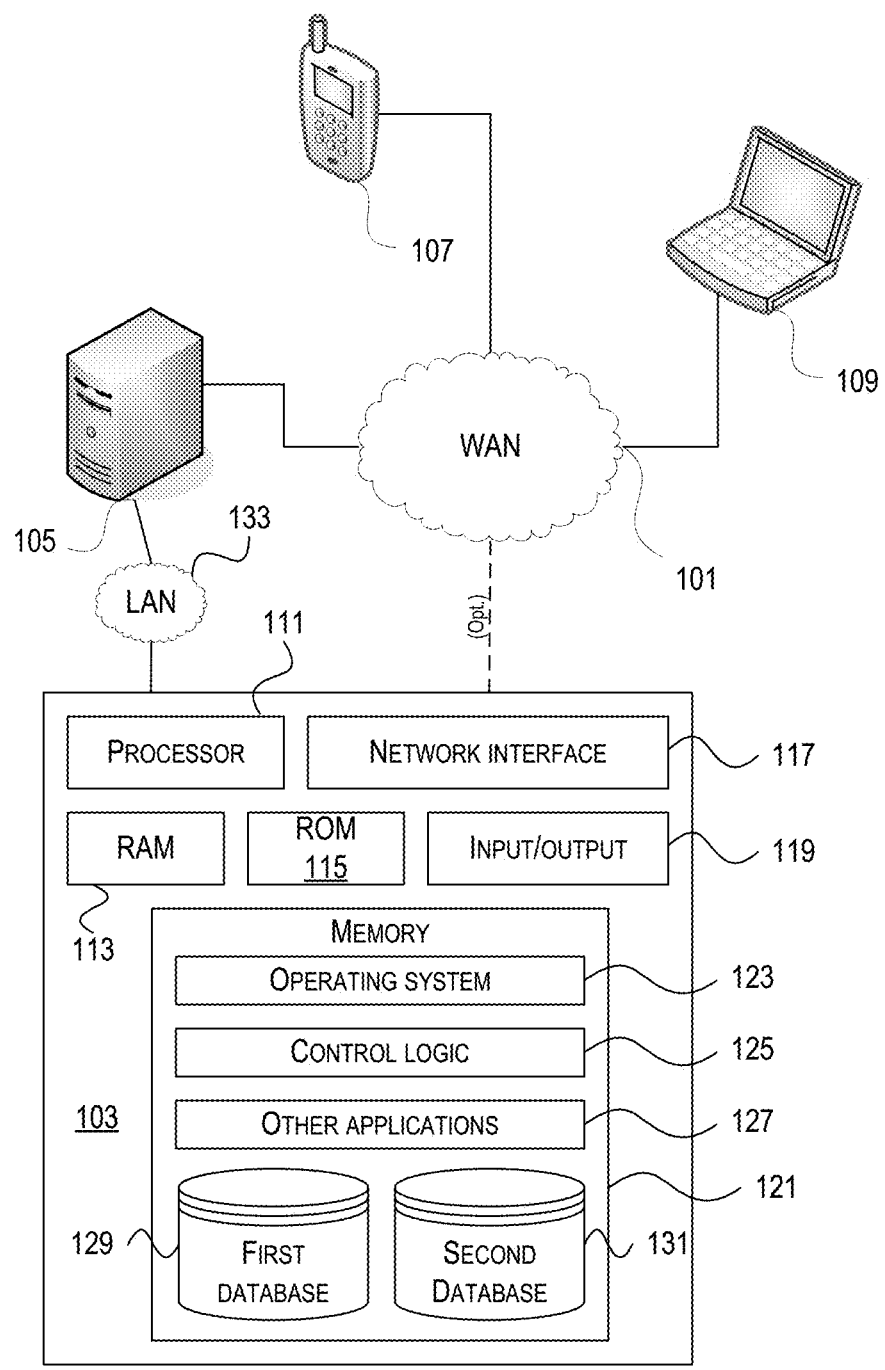
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
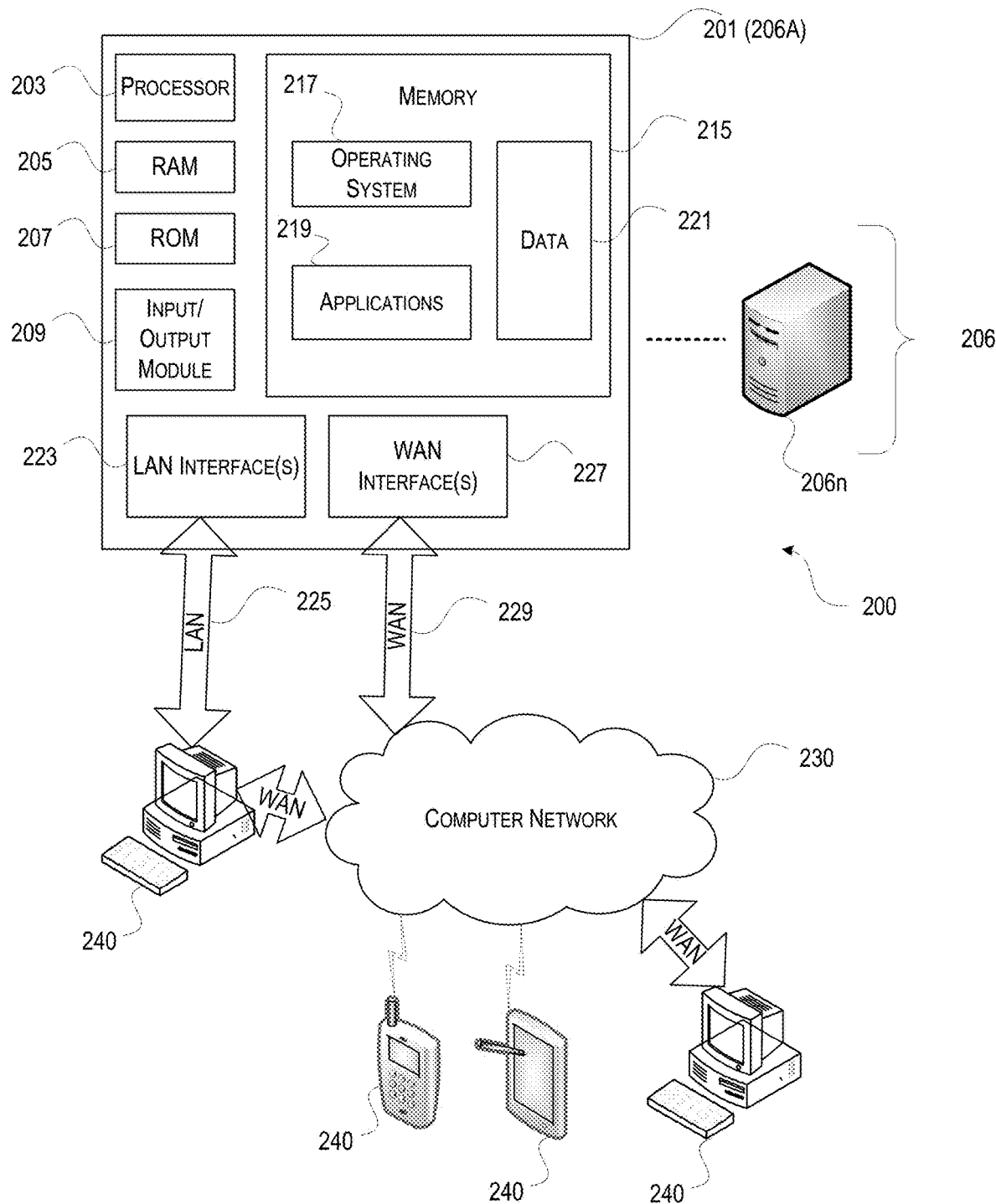
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Florida; or the Remote Desktop Protocol (RDP) manufactured by the Microsoft Corporation of Redmond, Washington.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
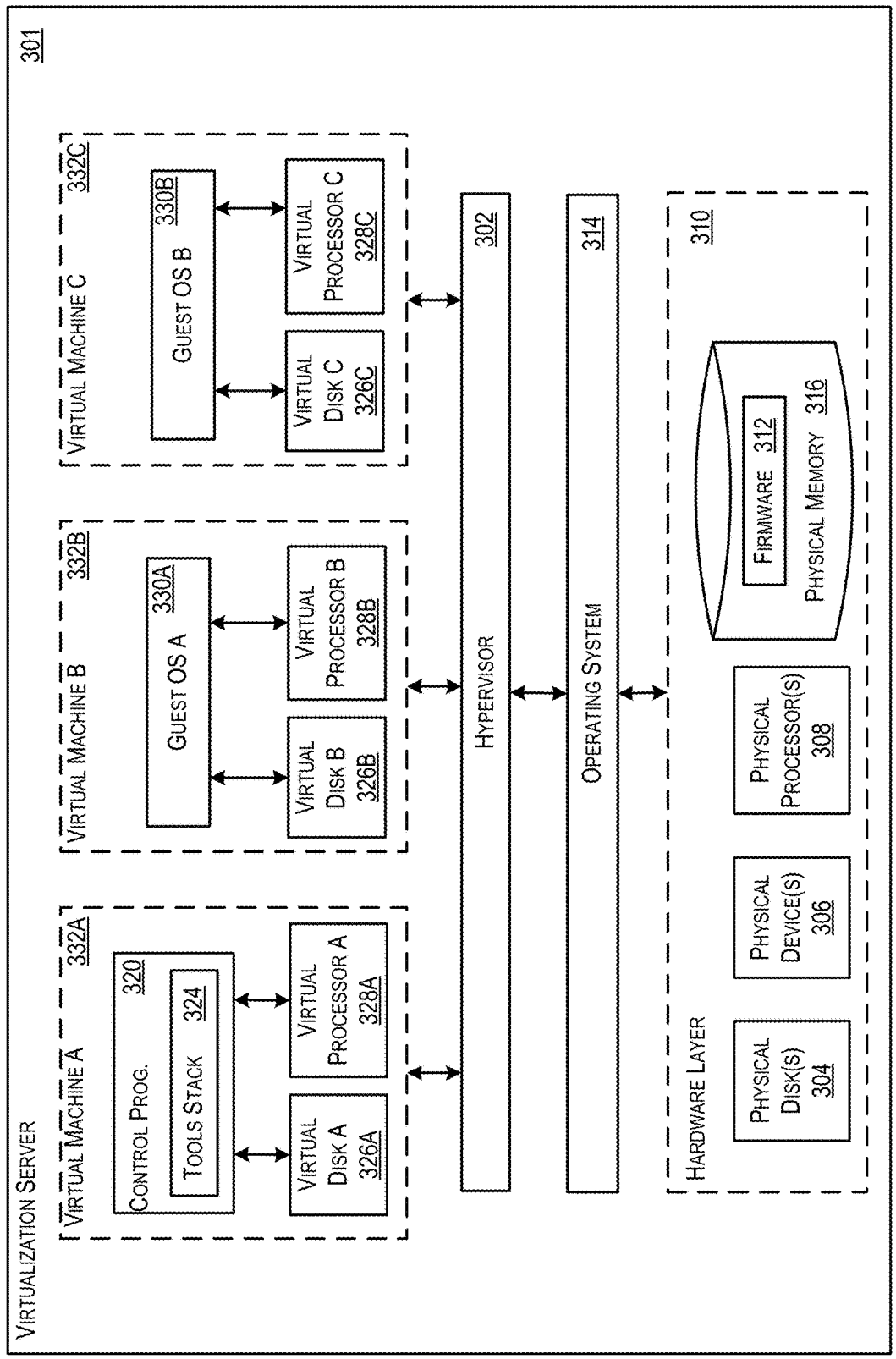
FIG. 3 depicts an illustrative virtualized system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e g, many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, California; HyperV, Virtual-Server or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the Citrix Hypervisor provided by Citrix Systems, Inc., of Fort Lauderdale, FL.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
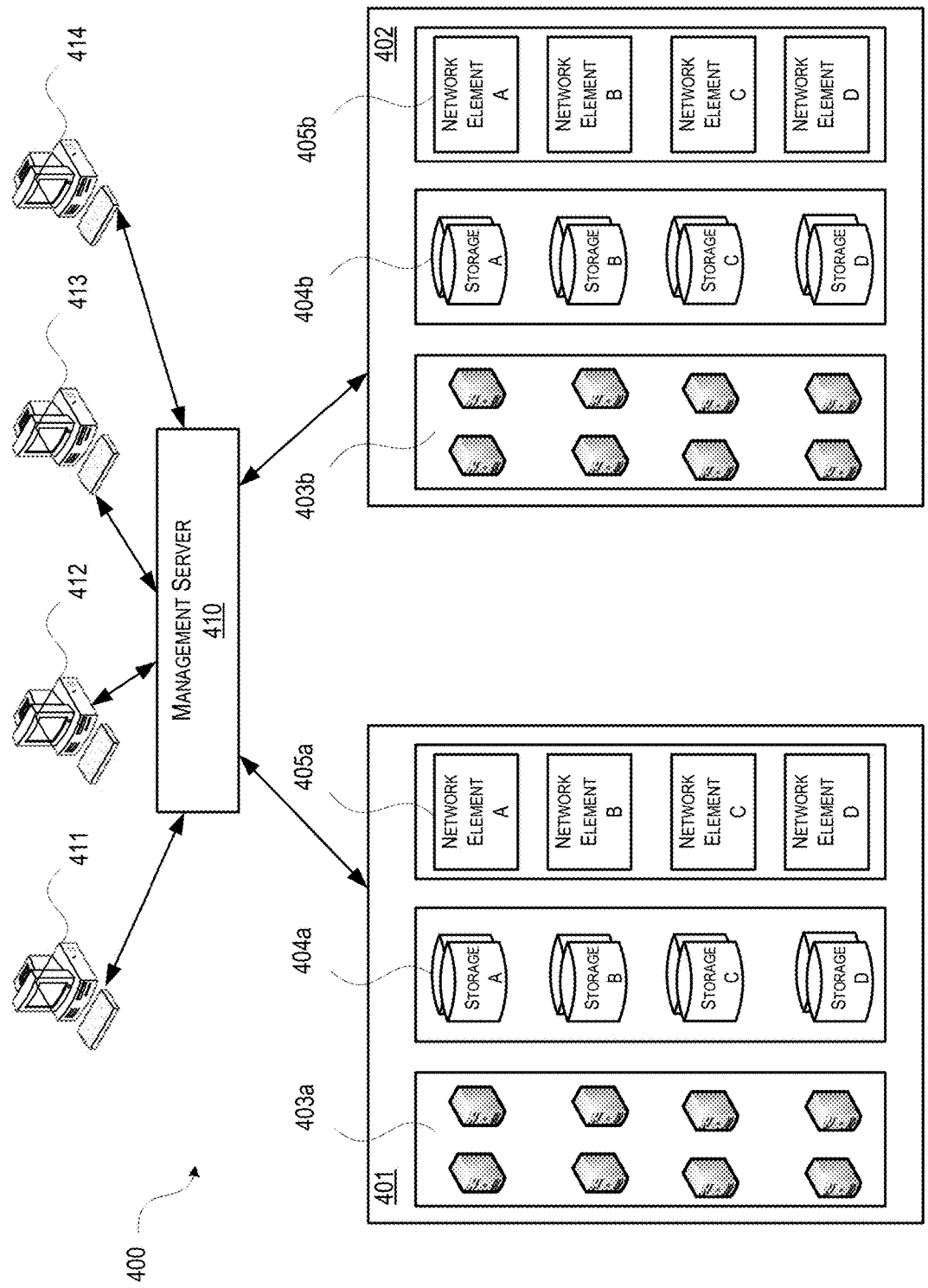
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, Citrix Cloud by Citrix Systems, Inc. of Ft. Lauderdale, FL, or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Washington), AMAZON EC2 (Amazon.com Inc. of Seattle, Washington), IBM BLUE CLOUD (IBM Corporation of Armonk, New York), or others.

Enterprise Mobility Management Architecture

Figure 5:
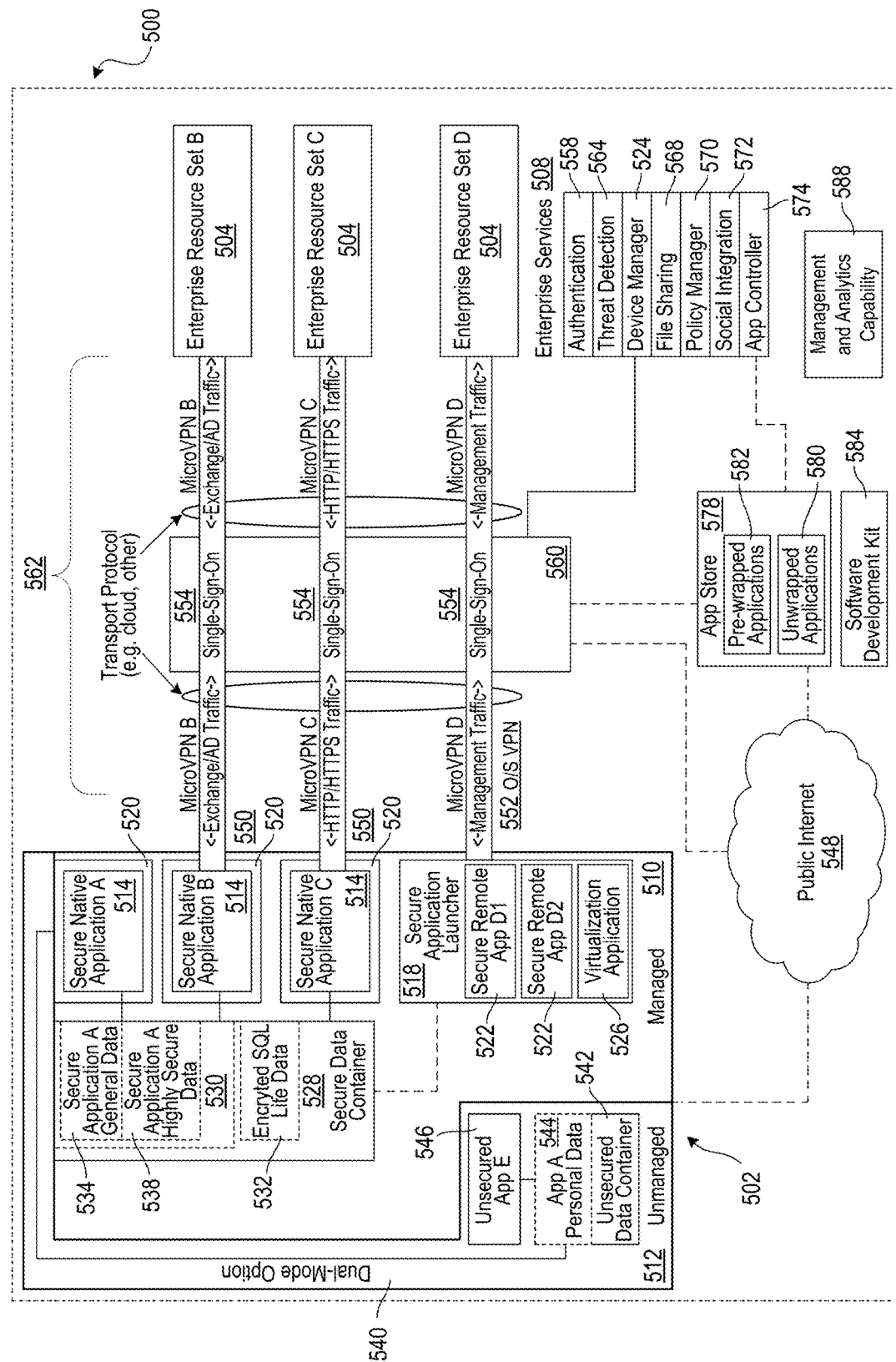
FIG. 5 depicts an illustrative enterprise mobility management system in accordance with one or more illustrative aspects described herein.

FIG. 5 represents an enterprise mobility technical architecture 500 for use in a "Bring Your Own Device" (BYOD) environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to the user. The user may utilize the mobile device 502 for business use only or for business and personal use. The mobile device 502 may run an iOS operating system, an Android operating system, or the like. The enterprise may choose to implement policies to manage the mobile device 502. The policies may be implemented through a firewall or gateway in such a way that the mobile device 502 may be identified, secured or security verified, and provided selective or full access to the enterprise resources (e.g., 504 and 508.) The policies may be mobile device management policies, mobile application management policies, mobile data management policies, or some combination of mobile device, application, and data management policies. A mobile device 502 that is managed through the application of mobile device management policies may be referred to as an enrolled device.

In some embodiments, the operating system of the mobile device 502 may be separated into a managed partition 510 and an unmanaged partition 512. The managed partition 510 may have policies applied to it to secure the applications running on and data stored in the managed partition 510. The applications running on the managed partition 510 may be secure applications. In other embodiments, all applications may execute in accordance with a set of one or more policy files received separate from the application, and which define one or more security parameters, features, resource restrictions, and/or other access controls that are enforced by the mobile device management system when that application is executing on the mobile device 502. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted to only be able to communicate with other managed applications and trusted enterprise resources, thereby creating a virtual partition that is not accessible by unmanaged applications and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application 514 is executed on the mobile device 502. The secure application wrapper 520 may include meta-data that points the secure native application 514 running on the mobile device 502 to the resources hosted at the enterprise (e.g., 504 and 508) that the secure native application 514 may require to complete the task requested upon execution of the secure native application 514. The secure remote applications 522 executed by a secure application launcher 518 may be executed within the secure application launcher 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application 526 may record user interactions associated with a graphical user interface (GUI) and communicate them to a server application where the server application will use the user interaction data as an input to the application operating on the server. In such an arrangement, an enterprise may elect to maintain the application on the server side as well as data, files, etc. associated with the application. While an enterprise may elect to "mobilize" some applications in accordance with the principles herein by securing them for deployment on the mobile device 502, this arrangement may also be elected for certain applications. For example, while some applications may be secured for use on the mobile device 502, others might not be prepared or appropriate for deployment on the mobile device 502 so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device 502 so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device 502 as well as a virtualization application 526 to allow access to applications that are deemed more properly operated on the server side. In an embodiment, the virtualization application 526 may store some data, files, etc. on the mobile device 502 in one of the secure storage locations. An enterprise, for example, may elect to allow certain information to be stored on the mobile device 502 while not permitting other information.

In connection with the virtualization application 526, as described herein, the mobile device 502 may have a virtualization application 526 that is designed to present GUIs and then record user interactions with the GUI. The virtualization application 526 may communicate the user interactions to the server side to be used by the server side application as user interactions with the application. In response, the application on the server side may transmit back to the mobile device 502 a new GUI. For example, the new GUI may be a static page, a dynamic page, an animation, or the like, thereby providing access to remotely located resources.

The secure applications 514 may access data stored in a secure data container 528 in the managed partition 510 of the mobile device 502. The data secured in the secure data container may be accessed by the secure native applications 514, secure remote applications 522 executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the mobile device 502 upon receipt of a command from the device manager 524. The secure applications (e.g., 514, 522, and 526) may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 546 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device 502 selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device 502 may connect to enterprise resources 504 and enterprise services 508 at an enterprise, to the public Internet 548, and the like. The mobile device 502 may connect to enterprise resources 504 and enterprise services 508 through virtual private network connections. The virtual private network connections, also referred to as microVPN or application-specific VPN, may be specific to particular applications (as illustrated by microVPNs 550, particular devices, particular secured areas on the mobile device (as illustrated by O/S VPN 552), and the like. For example, each of the wrapped applications in the secured area of the mobile device 502 may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway 560 may also re-route traffic from the mobile device 502 to the public Internet 548, enabling the mobile device 502 to access publicly available and unsecured applications that run on the public Internet 548. The mobile device 502 may connect to the access gateway via a transport network 562. The transport network 562 may use one or more transport protocols and may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud-based resources, and the like. The enterprise resources 504 may be accessed by the mobile device 502 directly or through the access gateway 560. The enterprise resources 504 may be accessed by the mobile device 502 via the transport network 562.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services, and the like. Authentication services 558 may use certificates. The certificates may be stored on the mobile device 502, by the enterprise resources 504, and the like. The certificates stored on the mobile device 502 may be stored in an encrypted location on the mobile device 502, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store 578 may be provided with an intuitive and easy to use user interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
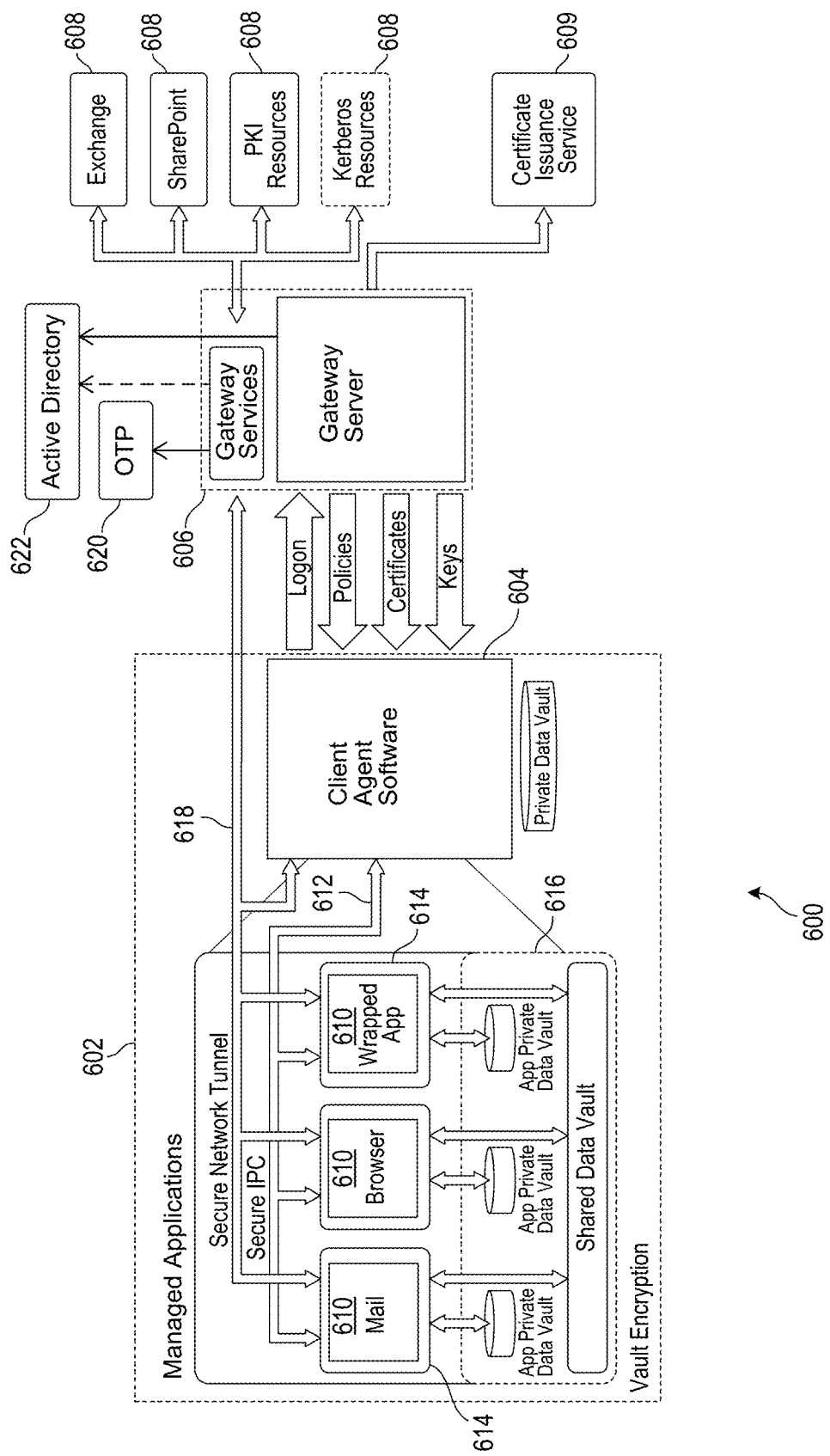
FIG. 6 depicts another illustrative enterprise mobility management system in accordance with one or more illustrative aspects described herein.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PKI) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the mobile device 602. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) 606 with SSO to other gateway server components. The client agent 604 obtains policies from gateway server 606 to control the behavior of the managed applications 610 on the mobile device 602.

The Secure InterProcess Communication (IPC) links 612 between the native applications 610 and client agent 604 represent a management channel, which may allow a client agent to supply policies to be enforced by the application management framework 614 "wrapping" each application. The IPC channel 612 may also allow client agent 604 to supply credential and authentication information that enables connectivity and SSO to enterprise resources 608. Finally, the IPC channel 612 may allow the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 may request policy information from client agent 604, which in turn may request it from gateway server 606. The application management framework 614 may request authentication, and client agent 604 may log into the gateway services part of gateway server 606 (for example, Citrix Gateway). Client agent 604 may also call supporting services on gateway server 606, which may produce input material to derive encryption keys for the local data vaults 616, or may provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel 612 and obtain the policy for that application. The application management framework 614 may enforce relevant portions of the policy that apply locally, such as the client agent login dependencies and some of the containment policies that restrict how local OS services may be used, or how they may interact with the managed application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 may be responsible for orchestrating the network access on behalf of each managed application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application 610 may use a special background network access mechanism that allows it to access an Exchange server 608 over an extended period of time without requiring a full AG logon. The Browser application 610 may use multiple private data vaults 616 to segregate different kinds of data.

This architecture may support the incorporation of various other security features. For example, gateway server 606 (including its gateway services) in some cases might not need to validate active directory (AD) passwords. It can be left to the discretion of an enterprise whether an AD password may be used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. If or when data is stored locally on the mobile device 602 in the secure container 616, it may be preferred that a minimum of AES 256 encryption algorithm be utilized.

Other secure container features may also be implemented. For example, a logging feature may be included, wherein security events happening inside a managed application 610 may be logged and reported to the backend. Data wiping may be supported, such as if or when the managed application 610 detects tampering, associated encryption keys may be written over with random data, leaving no hint on the file system that user data was destroyed. Screenshot protection may be another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the mobile device 602 is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, if or when a managed application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature may relate to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text may be sent to the user with an OTP 620. In some cases, this may be implemented only for online use, with a prompt being a single field.

An offline password may be implemented for offline authentication for those managed applications 610 for which offline use is permitted via enterprise policy. For example, an enterprise may want StoreFront to be accessed in this manner In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature may relate to the enablement of a client side certificate for certain applications 610 as secondary credentials (for the purpose of accessing PKI protected web resources via the application management framework micro VPN feature). For example, a managed application 610 may utilize such a certificate. In this case, certificate-based authentication using ActiveSync protocol may be supported, wherein a certificate from the client agent 604 may be retrieved by gateway server 606 and used in a keychain. Each managed application 610 may have one associated client certificate, identified by a label that is defined in gateway server 606.

Gateway server 606 may interact with an enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications 610, and ultimately by arbitrary wrapped applications 610 (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application 610 for each period of use. Application management framework client certificate support may use a HTTPS implementation with private in-memory key storage. The client certificate might not be present in the iOS keychain and might not be persisted except potentially in "online-only" data value that is strongly protected.

Mutual SSL or TLS may also be implemented to provide additional security by requiring that a mobile device 602 is authenticated to the enterprise, and vice versa. Virtual smart cards for authentication to gateway server 606 may also be implemented.

Another feature may relate to application container locking and wiping, which may automatically occur upon jailbreak or rooting detections, and occur as a pushed command from administration console, and may include a remote wipe functionality even when a managed application 610 is not running.

A multi-site architecture or configuration of enterprise application store and an application controller may be supported that allows users to be serviced from one of several different locations in case of failure.

In some cases, managed applications 610 may be allowed to access a certificate and private key via an API (for example, OpenSSL). Trusted managed applications 610 of an enterprise may be allowed to perform specific Public Key operations with an application's client certificate and private key. Various use cases may be identified and treated accordingly, such as if or when an application behaves like a browser and no certificate access is required, if or when an application reads a certificate for "who am I," if or when an application uses the certificate to build a secure session token, and if or when an application uses private keys for digital signing of important data (e.g. transaction log) or for temporary data encryption.

Providing Application Hotspots on Endpoint Devices

Figure 7A:
FIGS. 7A and 7B depict an illustrative computing environment for providing application hotspots on an endpoint device in accordance with one or more example embodiments.
Figure 7B:
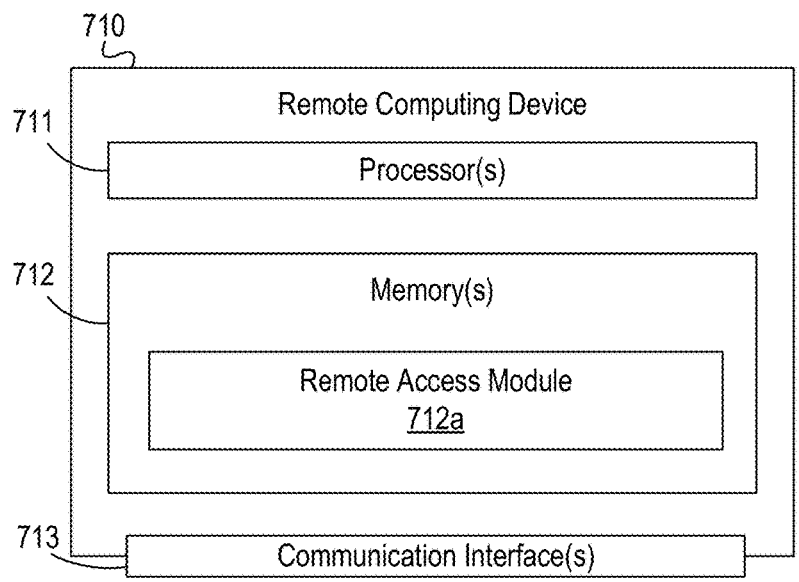

FIGS. 7A and 7B depict an illustrative computing environment for providing application hotspots on an endpoint device in accordance with one or more examples. A remote application may be hosted on a computing device (e.g., a remote computing device 710) and displayed on an endpoint device (e.g., an endpoint device 720) in a form of a user interface. A hotspot may be a feature that corresponds to a user interface element (e.g., a search bar, a close button) or a region in the remote application. The remote applications may be web browsing applications, software-as-a-service (SaaS) access applications, a spreadsheet application, or a non web-based application or the like. For example, a web browsing application may include one or more elements, such as a search bar for the user to input a search term or phrase. The web browsing application may include an element such as a close button to close or exit the web browsing application. Referring to FIG. 7A, computing environment 700 may include one or more computer systems. For example, computing environment 700 may include a remote computing device (e.g., virtualization server) 710 and an endpoint device (e.g., mobile device) 720.

As illustrated in greater detail below, remote computing device (e.g., virtualization server) 710 may be a computer system that includes one or more computing devices and/or other computer components (e.g., processors, memories, communication interfaces, servers, server blades, or the like) configured to perform one or more of the functions described herein. In addition, remote computing device 710 may be configured to host one or more remote applications or desktops (e.g., a remote desktop server). For example, remote computing device 710 may be similar to device 103 in FIG. 1 or computing device 201 in FIG. 2.

As illustrated in greater detail below, endpoint device (e.g., mobile device) 720 (which may, e.g., be a computing device similar to device 107, shown in FIG. 1, or client machine 240, shown in FIG. 2) may be a desktop computer, a computer server, a mobile device (e.g., a laptop computer, a tablet computer, a smart phone, any other types of mobile computing devices, and the like), and/or any other type of data processing device. In addition, endpoint device 720 may be configured to establish a remote application or desktop session (e.g., with the remote computing device 710). In some instances, remote computing device 710 may be similar to virtualization server 301, which is shown in FIG. 3.

Computing environment 700 may also include one or more networks, which may interconnect remote computing device 710 and endpoint device 720. For example, computing environment 700 may include a network 730 (which may e.g., interconnect remote computing device 710 and endpoint device 720). In some instances, the network 730 may be similar to computer network 230, which is shown in FIG. 2.

In one or more arrangements, remote computing device 710, endpoint device 720, and/or the other systems included in computing environment 700 may be any type of computing device capable of receiving a user interface, receiving input via the user interface, and communicating the received input to one or more other computing devices. For example, remote computing device 710, endpoint device 720, and/or the other systems included in computing environment 700 may in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of remote computing device 710 and/or endpoint device 720 may, in some instances, be special purpose computing devices configured to perform specific functions.

Referring to FIG. 7B, remote computing device 710 may include one or more processors 711, memory 712, and communication interface 713. A data bus may interconnect processor 711, memory 712, and communication interface 713. Communication interface 713 may be a network interface configured to support communication between the remote computing device 710 and one or more networks (e.g., network 730, or the like). Memory 712 may include one or more program modules having instructions that when executed by processor 711 cause remote computing device 710 to perform one or more functions described herein and/or access one or more databases that may store and/or otherwise maintain information which may be used by such program modules and/or processor 711. In some instances, the one or more program modules and/or databases may be stored by and/or maintained in different memory units of remote computing device 710. For example, memory 712 may have, host, store, and/or include a remote access module 712a. Remote access module 712a may cause or otherwise enable the remote computing device 710 to establish a remote application or desktop session (e.g., with endpoint device 720), as described in greater detail below.

Figure 8A:
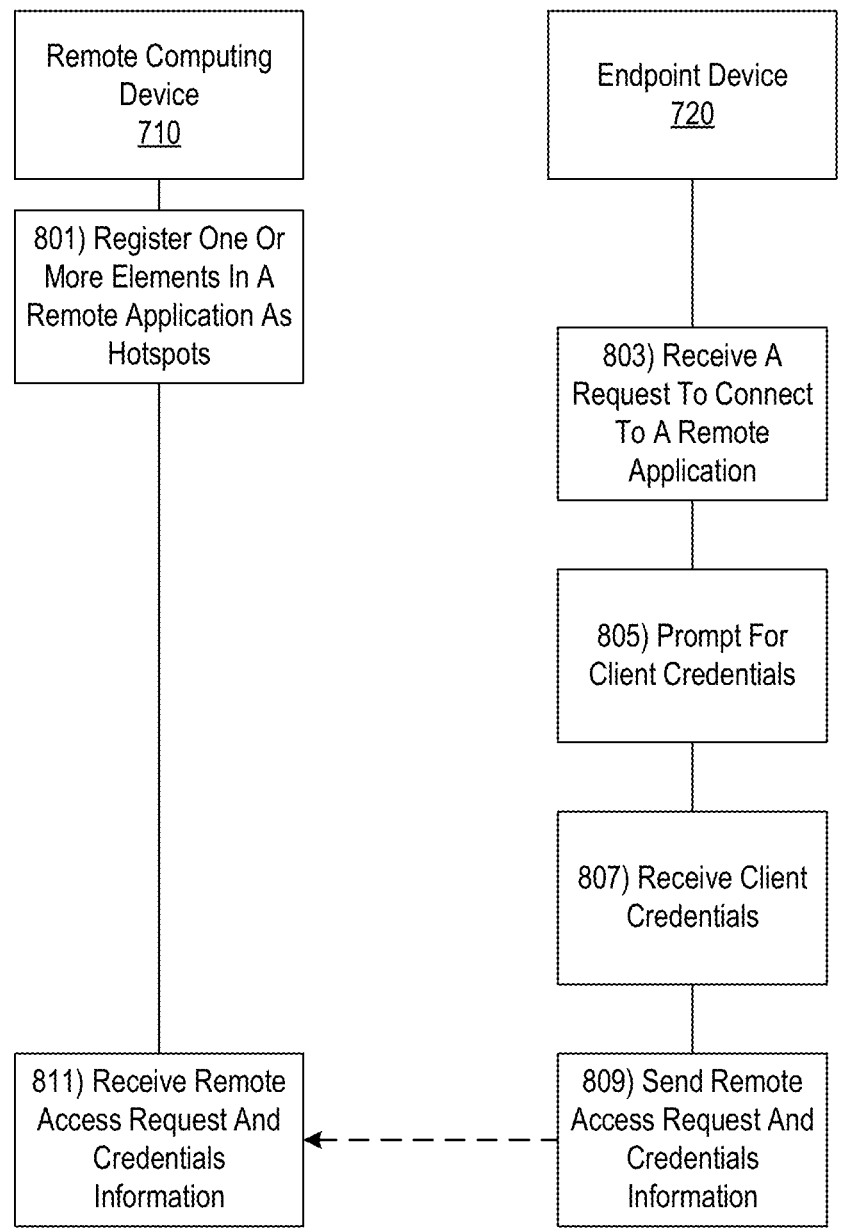
FIG. 8A-8C depict an illustrative event sequence for providing application hotspots on an endpoint device in accordance with one or more example embodiments.
Figure 8B:
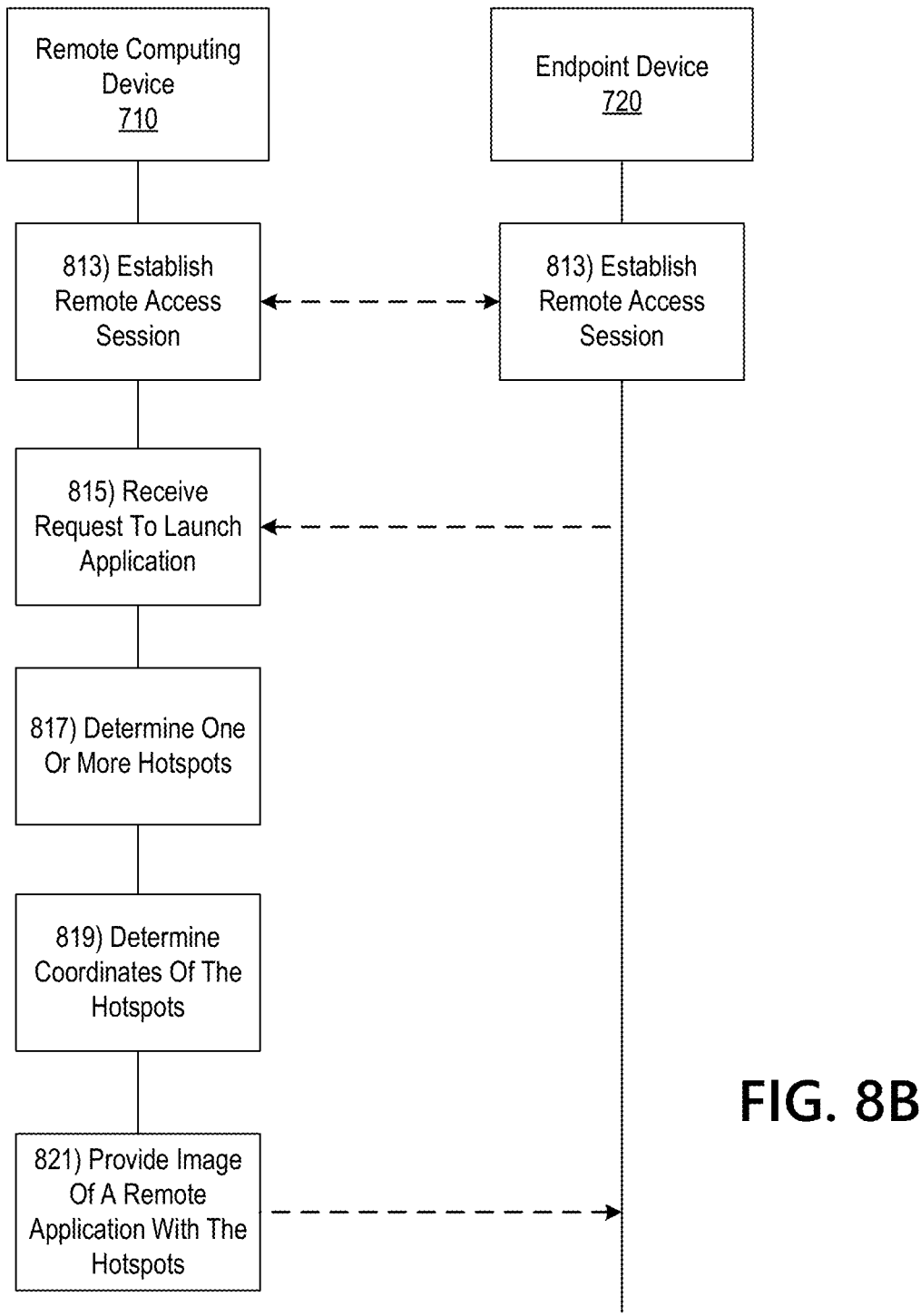
Figure 8C:
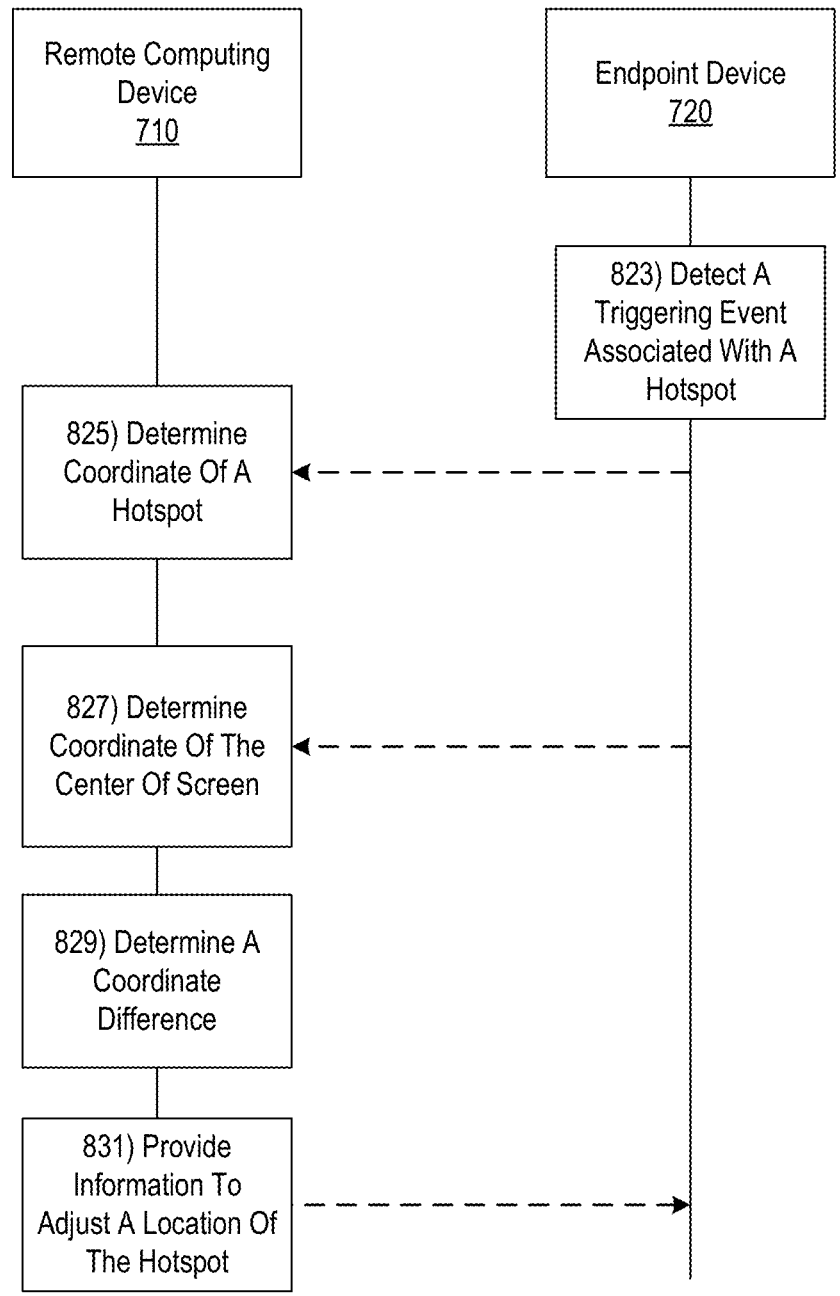
Figure 9:
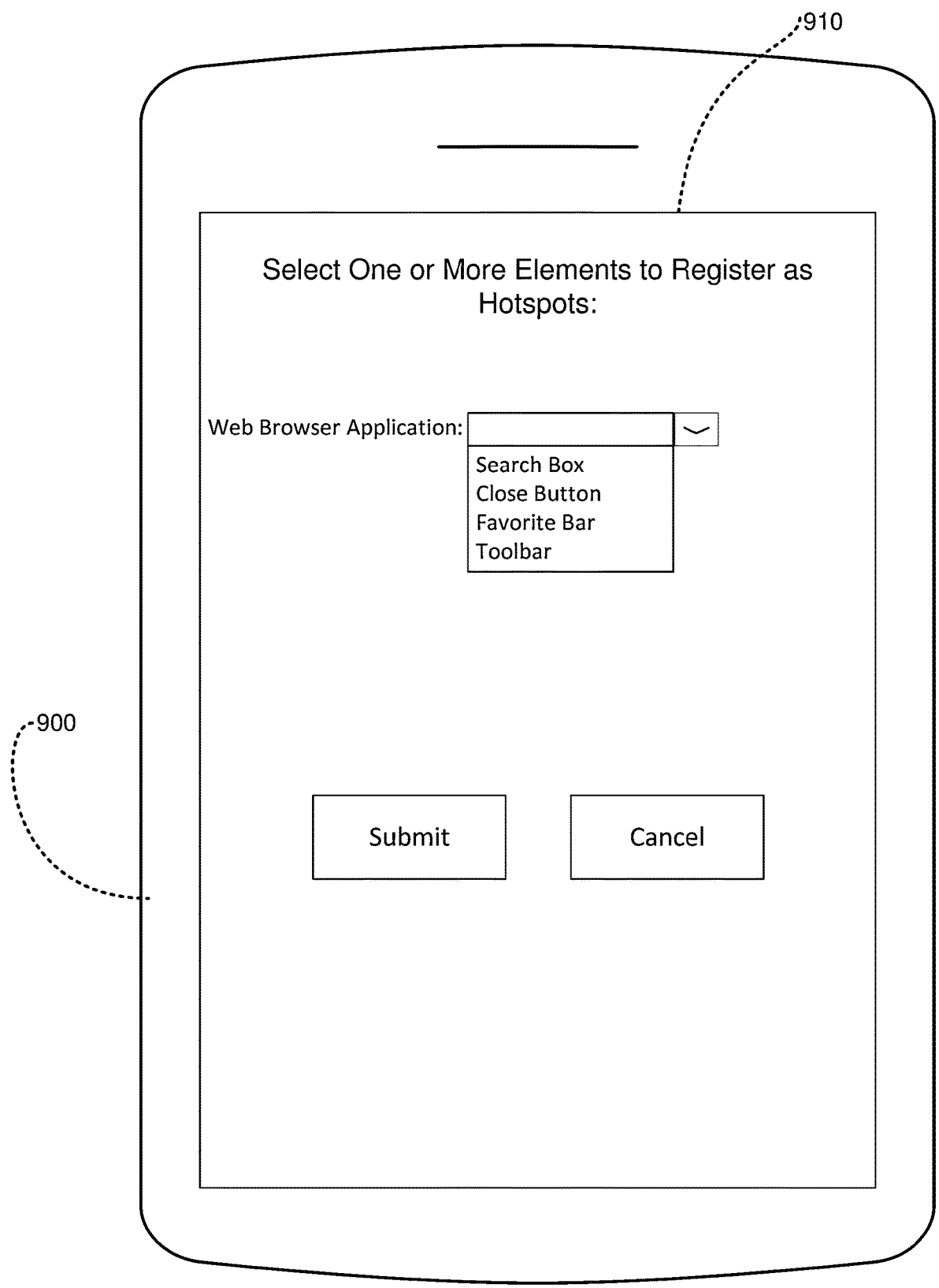
FIG. 9 depicts an example interface for registering a hotspot in accordance with one or more example embodiments.

FIGS. 8A-8C depict an example event sequence for providing application hotspots on an endpoint device in accordance with one or more illustrative aspects described herein. Referring to FIG. 8A, at step 801, a computing device (e.g., the remote computing device 710) may register one or more elements in a remote application as hotspots. For example, the remote application may be a web browsing application, such as a Chrome® application. The remote application may include one or more elements that are frequently accessed by the users. For example, the computing device may register an element "search bar" which provides a field for the users to enter a search term or phrase as a hotspot. The computing device may register an element "close button" which enables the users to close or exit the web browsing application as another hotspot. FIG. 9 depicts an example interface for registering a hotspot in accordance with one or more example embodiments. An administrator may login to an admin console 910 on device 900 to configure and register one or more hotspots for a remote application, such as a web browser application. For example, the web browser application may implement a Window interface that represents a window containing a Document Object Model (DOM). The computing device may use a web Application Programing Interface (API) to interact with the Window interface and inspect various elements in the DOM tree related to the web browser application. The computing device may employ a method (e.g., getElementById("element_id")) on the web API to retrieve the element with the specified identifier. The computing device may identify, for example, various elements in the web browser application including a search bar, a close button, a favorite bar and a toolbar and present them as options to be registered as hotspots on admin console 910.

The administer may select one or more elements from a dropdown list to register them as hotspots in the web browser application. For example, the administrator may select the search bar and the close button as two hotspots for the web browser application. The computing device may receive this selection and store two records in a configuration table. For example, the first record in the configuration table may include the application identifier (e.g., an application identifier for the web browser application), an element identifier (e.g., an element_id1 for the search bar), a shortcut (e.g., as an icon on a floating menu bar) and a default location (e.g., default coordinates) to display the first hotspot in a user interface. The second record in the configuration table may include the application identifier (e.g., an application identifier for the web browser application), an element identifier (e.g., an element_id2 for the close button), a shortcut (e.g., as an icon on a floating menu bar) and a default location (e.g., default coordinates) to display the second hotspot in a user interface. The computing device may store the configuration information in a database. The computing device may later retrieve the records from the database and render the hotspots on the user interface of the endpoint device based on the configuration information.

A floating menu bar may be presented on an image of the remote application. An icon on the floating menu bar may represent a shortcut to the hotspot that is generated based on an UI element or a region of the remote application. When the user opens a remote session on the endpoint device, the user may tap or click on the icon to cause the corresponding hotspot region to be prominently displayed on the screen of the endpoint device.

In some examples, the hotspots may be determined based on how frequently an element is accessed by the users. The computing device may register elements as hotspots if they satisfy a threshold number of access within a predetermined period of time (e.g., an hour, a day, a week, a month, etc.) The computing device may register elements as hotspots for top-accessed elements (e.g., top one, top two, top five or top ten elements) in the remote application.

In some examples, the hotspots may be determined based on a criticality associated with an element in the remote application. For example, a remote application may display a landing page for an enterprise user to access various resources in the enterprise application. An administrator in the enterprise may define certain elements (e.g., an email icon or a helpdesk icon) in the landing paper as mission critical and assign these elements as hotspots.

In some examples, the hotspots may be determined based on a preference associated with an element in the remote application. For example, a remote application may display a banking application allowing the users to check balances and making online payments. An administrator may define certain elements (e.g., a checking account or a credit card account) based on user preferences and assign these elements as hotspots to facilitate user access to the corresponding accounts.

In some examples, the hotspots may be determined based on a type of the endpoint devices. For example, the remote application may be a web browsing application, such as a Chrome® application or a Safari® application. The remote application may include one or more elements such as a "search bar" or a "close button." In some examples, the computing device may parse a User-Agent (UA) string contained in HTTP headers related to a web browser application and translate the UA string to an understandable device type. For example, a first UA string "Mozilla/5.0 (X11; CrOS x86_64 8172.45.0) AppleWebKit/537.36 (KHTML, like Gecko) Chrome/51.0.2704.64 Safari/537.36" may indicate a Chrome OS-based laptop computer using Chrome browser. A second UA string "Mozilla/5.0 (Windows NT 6.1; WOW64) AppleWebKit/537.36 (KHTML, like Gecko) Chrome/47.0.2526.111 Safari/537.36" may indicate a Windows 7-based desktop computer using a Chrome browser. A third UA string "Mozilla/5.0 (Linux; Android 7.0; Pixel C Build/NRD90M; wv) AppleWebKit/537.36 (KHTML, like Gecko) Version/4.0 Chrome/52.0.2743.98 Safari/537.36" may indicate a Google Pixel C tablet. A fourth UA string "Mozilla/5.0 (iPhone; CPU iPhone OS 11_0 like Mac OS X) AppleWebKit/604.1.38 (KHTML, like Gecko) Version/11.0 Mobile/15A372 Safari/604.1" may indicate an Apple iPhone X. For example, if the endpoint device is a mobile device, and due to the limited screen size of the mobile device, a close button on the web browser application may be difficult to locate and operate on. The computing device may register the close button as a hotspot for the mobile device. On the other hand, if the endpoint device is a desktop computing device, the close button may be prominently displayed on the screen of the desktop computing device that is more readily to be located and operated on. The computing device might not register the close button as a hotspot for the desktop computing device. It is possible to determine the hotspots based on other factors, or any combination of the factors discussed above.

At step 803, an endpoint device (e.g., a client agent or remote access module on an endpoint device) may receive a request to connect to a remote application or desktop. For example, the endpoint device 720 may be located on a network, different than an enterprise network corresponding to the remote computing device 710. A request may be received to connect to a web browsing application in order to access resources in the enterprise network. The endpoint device 720 may receive the request to connect to the web browsing application by receiving a user input via a display of the endpoint device 720 or another input mechanism corresponding to the endpoint device 720 (keyboard input, mouse input, or the like).

At step 805, after receiving the request to connect to the remote application at step 803, the endpoint device 720 may prompt a user to input credentials. For example, the endpoint device 720 may prompt the user to provide authentication information verifying that the user is permitted to access the enterprise network. In some instances, in prompting for the credentials, the endpoint device 720 may prompt for a username, password, authentication key, and/or other authentication information (which may, in some instances, include multifactor authentication). These credentials may be used by the remote computing device 710 to authenticate the user.

At step 807, the endpoint device 720 may receive the credentials requested at step 805. At step 809, the endpoint device 720 may send the request to connect to the remote application, along with the credentials received at step 805, to the remote computing device 710. The endpoint device 720 may send information (e.g., security information) indicating device security or integrity corresponding to the endpoint device 720. For example, the endpoint device 720 may generate a numeric identifier and/or other indication of an integrity level of the endpoint device 720 (e.g., based on whether or not the endpoint device 720 is rooted, or other security information), and may send this information to the remote computing device 710. The endpoint device 720 may also send the information at a later time once the remote access session is established.

At step 811, the remote computing device 710 may receive the request to connect to the remote application, credentials, and/or information about security of the device 720 from the endpoint device 720. The remote computing device 710 may attempt to validate the received credentials. The remote computing device 710 may retrieve a record from an authentication database based on the user name in the received credentials. The remote computing device 710 may compare the credentials received from the endpoint device 720 with credentials stored by the authentication database. If the received credentials match with the stored credentials, the received credentials may be validated. If the remote computing device 710 validates the received credentials, the remote computing device 710 may proceed to step 813 of FIG. 8B. If the remote computing device 710 determines that the received credentials are invalid, the remote computing device 710 may send a notification to the endpoint device 720, indicating that the received credentials were not authenticated and requesting updated credentials.

Referring to FIG. 8B, at step 813, based on or in response to authenticating the credentials at step 809, the remote computing device 710 may establish a remote access session with the endpoint device 720. For example, the endpoint device 720 may allow the endpoint device 720 to operate on the enterprise network from a remote location.

At step 815, while the remote access session is established with a computing device (e.g., the remote computing device 710), the computing device may receive a remote application or desktop request to launch an application (e.g., a remote application) in the endpoint device (e.g., mobile device) 720. The computing device may receive this request based on an input received at the endpoint device 720. The user input may be received within the client application running on the endpoint device 720, and interpreted by the remote computing device 710 (e.g., rather than at endpoint device 720) due to the established remote application or desktop session.

Figure 10A:
FIGS. 10A-10B and 11A-11C depict example diagrams for providing application hotspots on an endpoint device in accordance with one or more illustrative aspects described herein.

At step 817, the computing device (e.g., the remote computing device 710) may determine one or more hotspots associated with the remote application. The one or more hotspots may correspond to one or more elements in the remote application. For example, the remote application may include a web browsing application as illustrated in FIG. 10A. In the example of FIG. 10A, an image of the remote application (e.g., web browsing application 1002) is displayed in a screen 1001 of the endpoint device (e.g., endpoint device 720). The web browsing application 1002 may include two elements, a search bar element 1003 and a close button 1004. The computing device may retrieve the corresponding element identifiers that uniquely identify the elements within the remote application and hotspots may be defined based on the element identifiers. For example, a hotspot "search bar" may correspond to an element identifier "chrome-id-1" and the hotspot "close button" may correspond to an element identifier "chrome-id-2."

The computing device may retrieve the element identifiers from a configuration table that stores configuration information related to various hotspots on a plurality of applications. For example, a configuration table for multiple applications may store a record including an identifier (e.g., an application identifier for the web browser application), an element identifier (e.g., an element_id1 for the search bar), a shortcut (e.g., as an icon on a floating menu bar) and a default location (e.g., default coordinates) to display the corresponding hotspot in a user interface.

A configuration table may store configuration information related to a single application and there may be multiple configuration tables for different applications. For example, a configuration table for a Chrome application may store a record including an element identifier (e.g., an element_id1 for the search bar), a shortcut (e.g., as an icon on a floating menu bar) and a default location (e.g., default coordinates) to display the corresponding hotspot in a user interface. A configuration table may store configuration information related to a certain types of applications. For example, a configuration table for web browser applications may store a first record including an application identifier for a Chrome application, an element identifier (e.g., an element_id1 for the search bar), a shortcut (e.g., as an icon on a floating menu bar) and a default location (e.g., default coordinates) to display the corresponding hotspot in a user interface. The configuration table for web browser applications may store a second record including an application identifier for a Safari application, an element identifier (e.g., an element_id2 for the search bar), a shortcut (e.g., as an icon on a floating menu bar) and a default location (e.g., default coordinates) to display the corresponding hotspot in a user interface. These configuration tables may be updated based on user selections by an administrator on FIG. 9. For example, the administrator may select an additional hotspot "favorite bar" for a Chrome application. The configuration table may be updated with a new record including application identifier (e.g., an identifier for a Chrome), an element identifier (e.g., an element_id3 for the favorite bar), a shortcut (e.g., as an icon on a floating menu bar) and a default location (e.g., default coordinates) to display the corresponding hotspot in a user interface. Conversely, the administrator may remove a hotspot from the user interface, and the corresponding record may be deleted from the configuration table or set as "inactive." In some examples, the endpoint device may detect that a user has clicked on a feature or a region in the remote application. The endpoint device may retrieve the corresponding element identifier associate with the feature or region, and send the element identifier to the computing device dynamically. The computing device may use the element identifier to determine whether a hotspot has been defined for the feature or region by looking up the configuration table.

As can be seen in FIG. 10A, the search bar 1003 may be too small to allow a user of the endpoint device with an appropriate way to enter a search term or phrase (e.g., due to limitations of the mobile screen). In other instances, all or a portion of the web browsing application 1002 may be obscured from the screen 1001, preventing a user from accessing the close button 1004 (not shown in FIG. 10A). As a result, the user may need to constantly adjust the size and location of these elements and this manual process may result in less optimal user experience.

At step 819, the computing device (e.g., the remote computing device 710) may determine, based on a resolution of a screen of the endpoint device, coordinates associated with the one or more hotspots. The coordinates may be representative of locations of the hotspots in a canvas on which to render an image for display on a screen of the endpoint device 720. The computing device may receive (e.g., by a virtual delivery agent) position information (e.g., which may be or include coordinates, or other system of grid or lines) for the hotspots on the screen of the endpoint device 720. For example, the coordinates may include one or more numbers that specify the location of a point on a line, on a surface, or in space. The coordinates may correspond to an ordered pair (x, y) that represents positions relative to an origin (0, 0), where the first number is the x-coordinate and the second number is the y-coordinate. While a two-dimensional coordinate system is illustrated herein, embodiments may be implemented in other dimension or spaces, and other coordinate systems may be used. For example, the remote computing device 710 may receive coordinates (e.g., from endpoint device 720) representative of locations of the hotspots in a canvas on which to render an image for display on a screen of the endpoint device 720. The screen may be defined by height and width attributes used to render an image of the remote application. For example, getWindow-Manger( ).getDefaultDisplay may retrieve the height and width attributes associated with a display screen on an Android® mobile device.

Different endpoint devices may have different screen resolutions. A native resolution may correspond to the number of pixels on a display screen of the endpoint device. A higher resolution screen may include more pixels, which provide the ability to display more visual information resulting in greater clarity and more detail. For example, the original iPhone® launched in 2007 had a native resolution of 320 pixels×480 pixels. An iPhone 12® has a native resolution of 2532 pixels×1170 pixels. Samsung Galaxy Note 8® has a native resolution of 2960 pixels×1440 pixels.

The computing device may support for coordinate translation to resolve discrepancies in screen locations, sizes, resolutions and/or the like between the client device (e.g., endpoint device 720) and the computing device (e.g., remote computing device 710). In some examples, the endpoint device 720 may translate the physical or native screen coordinates (e.g., device coordinates on the screen of the endpoint device) into logical screen coordinates before sending them to remote computing device 710. The logical screen coordinates may be a consistent measurement of a location of a point on a screen regardless of a display resolution or a physical size of a monitor. The physical or native (e.g., device) coordinates may use a horizontal distance (e.g., x-axis) and a vertical distance (e.g., y-axis) from a top left corner of a screen (e.g., a coordinate origin (0,0)) to specify a position of an object (e.g., in pixels). Because pixel size may vary (e.g., based on display resolution or a physical size of a monitor), and there is no fixed relation between physical inches and pixels, logical coordinates may be used for determining a location of a hotspot. For example, logical coordinates may be in logical units (e.g., a logical inch, which may be converted to pixels). The size of a logical unit may be determined by a mapping mode (e.g., set by a programmer) that maps a logical unit to a physical unit of measurement. The conversion of physical coordinates to logical coordinates may be determined by mapping method that converts between physical coordinates and logical coordinates. Using the logical coordinate system, the remote computing device 710, may provide a consistent display to an endpoint device 720 regardless of the display resolution or the screen size of the endpoint device 720.

In some examples, coordinates may be defined with respect to a reference position (which may, for example, be any point on the mobile screen). The reference position may provide a way to generate or estimate position information of various elements in a canvas on which an image for display on a screen of the endpoint device 720 may be rendered. For example, coordinates may be defined with respect to a top left corner (e.g., origin (0,0)) of the canvas, or other reference position on the screen. Coordinate translation may be performed by the client or by the server or both. As such, the locations of the hotspots may be translated to the logical coordinates relative to a reference point in the canvas or on the screen of endpoint device 720.

At step 821, the computing device (e.g., the remote computing device 710) may provide an image of a remote application with the hotspots to the endpoint device. For example, the applications may be remoted in a manner in which windows are created on the endpoint device so as to make the application display seem as if it were running locally on the endpoint device. In another example, a remoted application may be provided in a windowed mode where a desktop is remoted to the endpoint device and the application is displayed as an application executing in the remoted desktop. Various other remoting methods and techniques may also be implemented or used. In some examples, the hotspots may be displayed based on the initial or default coordinates set by the administrator. The administrator may also set a default position and dimension for the remote application presented on the endpoint device 720. In this case, the hotspots may be displayed in the appropriate locations on the image of the remote application. The endpoint device 720 may further display a floating bar menu on the screen that includes icons representing shortcuts to the hotspots in the remote application.

Referring to FIG. 8C, at step 823, the endpoint device may detect an event (e.g., a triggering event) associated with the hotspots, such as a click operation or a tap operation on the image of the remote application. For example, using a virtual trackpad, keyboard input, or other virtual input device, a user may interact with a remote application via the image of the remote application displayed on the endpoint device 720. Such input being received on the image of the remote application may include a variety of instrument, hand, or finger movements, and actions including touching a point on the screen, stylus pen inputs, or the like. In some examples, the touch input may be converted into mouse events or other types of input events for an application that is not configured to receive and process touch input. The endpoint device 720 may send the triggering event to the remote computing device 710.

Figure 10B:
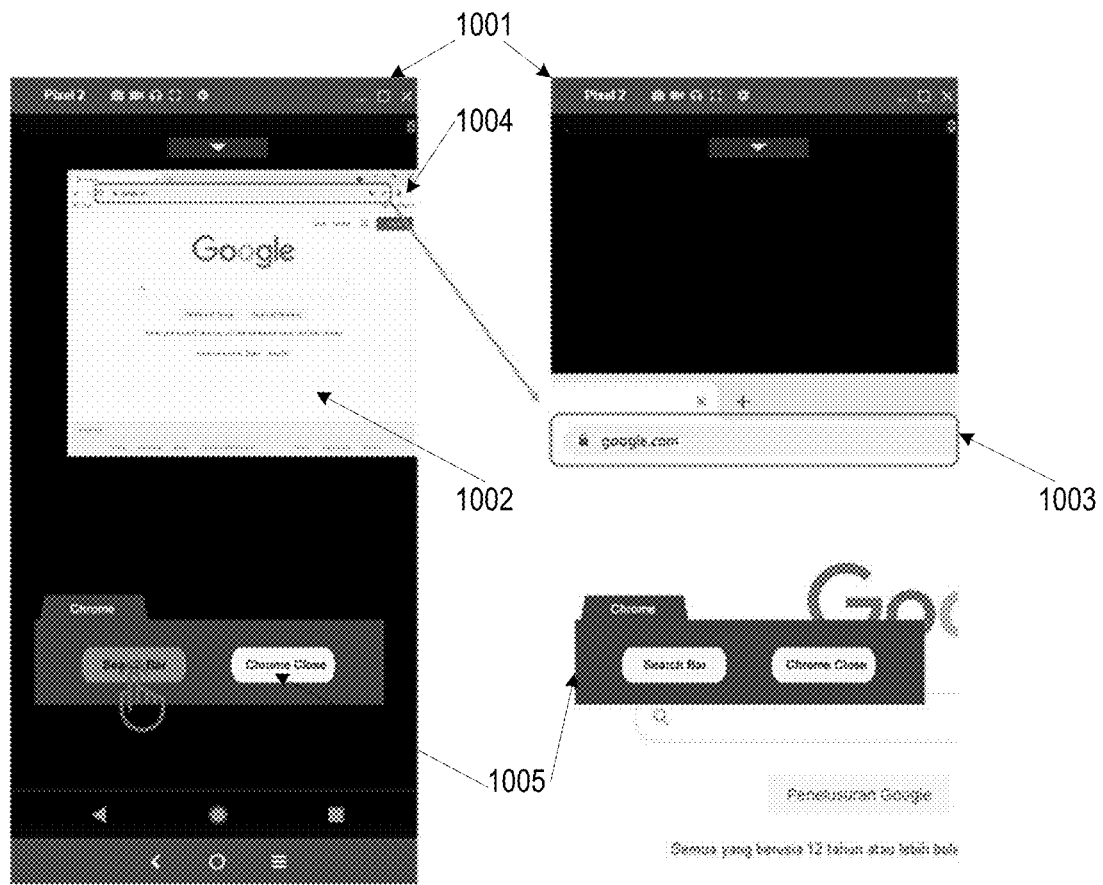

FIG. 10B illustrates an example image of a remote application with the hotspots displayed on an endpoint device. As shown in FIG. 10B, on the left-hand side, the screen 1001 displays a remote application (e.g., web browser application 1002) and a floating bar menu 1005 that includes icons representing shortcuts to a search bar hotspot and the close button (e.g., Chrome® close) hotspot. The icon labelled as "Search Bar" button on the floating bar menu 1005 corresponds to a shortcut to the search bar 1003 in the web browser application 1002. The icon labelled as "Chrome Close" button on the floating bar menu 1005 corresponds to a shortcut to the close button 1004 on the web browser application 1002.

As shown in FIG. 10B, on the left-hand side, the user may click or tap the "Search Bar" button on the floating menu bar 1005 on the endpoint device 720. The endpoint device 720 may in turn detect this event. The tapping or clicking operation on the shortcut to the search bar 1003 may cause the corresponding hotspot to be zoomed in and/or moved to the center of the screen 1001. On the right-hand side of FIG. 10B, the search bar 1003 may be zoomed in and displayed in a location in the middle of the screen 1001 on the endpoint device 720. The floating menu bar 1005, in some examples, is displayed consistently in the lower portion of the screen 1001 both in the left-hand side and the right-hand side of FIG. 10B.

Referring back to FIG. 8C, at step 825, after receiving the event (e.g., a triggering event), the computing device (e.g., the remote computing device 710) may determine coordinates representative of the locations of the hotspots displayed on the endpoint device 720. In addition, the locations may be measured in pixels, millimeters, inches, logical units or other suitable dimensional parameters. Such coordinates may, for instance, include coordinates of a location of the hotspot on the endpoint device 720 (e.g., logical coordinates corresponding to a position of control $[X_L, Y_L]$), with respect to a reference position (e.g., an origin in the canvas on which an image of the remote application is rendered). For example, coordinates $[X_H, Y_H]$ may correspond to a position of a hotspot (e.g., search bar or close button) that the user performs a click or tap operation. The event may, for instance, be received on the image of the remote application (e.g., at endpoint device 720).

At step 827, the computing device (e.g., the remote computing device 710) may determine coordinates representative of the center of the screen from the endpoint device 720. For example, the computing device may use a horizontal distance (e.g., x-axis) and a vertical distance (e.g., y-axis) from a top left corner of a screen (e.g., a coordinate origin (0,0)) to specify a position of the center of the screen (e.g., in pixels). The horizontal distance and the vertical distance may be logical coordinates in logical units (e.g., a logical inch, which may be converted to pixels). Using the logical coordinate system, the center of the screen may correspond to a consistent representation on the user interface of the endpoint device regardless of the display resolution or the screen size of the endpoint device. Such coordinates may, for instance, include coordinates of a location of the center of the screen on the endpoint device 720 (e.g., logical coordinates corresponding to a position of control $[X_L, Y_L]$), with respect to a reference position (e.g., an origin in the canvas on which an image of the remote application is rendered). For example, coordinates $[X_C, Y_C]$ may correspond to a position of the center of screen on the endpoint device 720.

At step 829, the computing device (e.g., the remote computing device 710) may determine the coordinate differences representative of a distance from the hotspot to the center of the screen on the endpoint device 720. Likewise, the computing device may use a horizontal distance (e.g., x-axis) and a vertical distance (e.g., y-axis) from a top left corner of a screen (e.g., a coordinate origin (0,0)) to specify a position of the hotspot. For example, coordinates $[X_H, Y_H]$ may correspond to a position of the hotspot on the endpoint device 720. The computing device may determine the coordinate differences between the hotspot (e.g., $(X_H, Y_H)$ and the center of the screen (e.g., $X_C, Y_C$) based on their horizontal distance and the vertical distance. Coordinates $[X_{H-C}, Y_{H-C}]$ may correspond to the coordinate differences from a location of the hotspot to a position of the center of screen on the endpoint device 720. In some examples, the center of the screen may be defined as a reference position $[X_0, Y_0]$. The coordinate differences may be determined based the coordinates $[X_H, Y_H]$ of a location of the hotspot on the endpoint device 720, with respect to the reference position $[X_0, Y_0]$. For example, the coordinate difference may be defined as $[X_H, Y_H]$ when using the center of the screen as a reference position.

At step 831, the computing device (e.g., the remote computing device 710) may provide data (e.g., instructions, commands, or executable codes) to the endpoint device 720 in response to receipt of the event (e.g., a triggering event) from the endpoint device 720 (e.g., at step 823). Such information may enable the endpoint device 720 to adjust the size or location of the hotspot. For example, the data provided by the remote computing device 710 to the endpoint device 720 may include information to move the hotspot to a center of the screen of the endpoint device 720 based on the coordinates difference. The data provided by the remote computing device 710 to the endpoint device 720 may include information to move the hotspot to location that has a minimal distance from the center of the screen of the endpoint device 720. The information provided by the remote computing device 710 to the endpoint device 720 may include information to perform zoom in or zoom out operations on the hotspot on the screen of the endpoint device 720. The various operations to change the size and the location of the hotspot are illustrated in further detail in FIGS. 10A-10C.

Figure 11A:
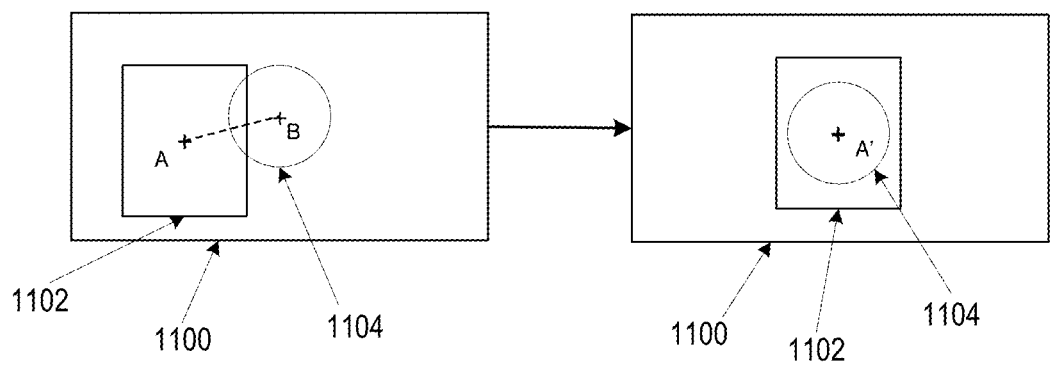
Figure 11B:
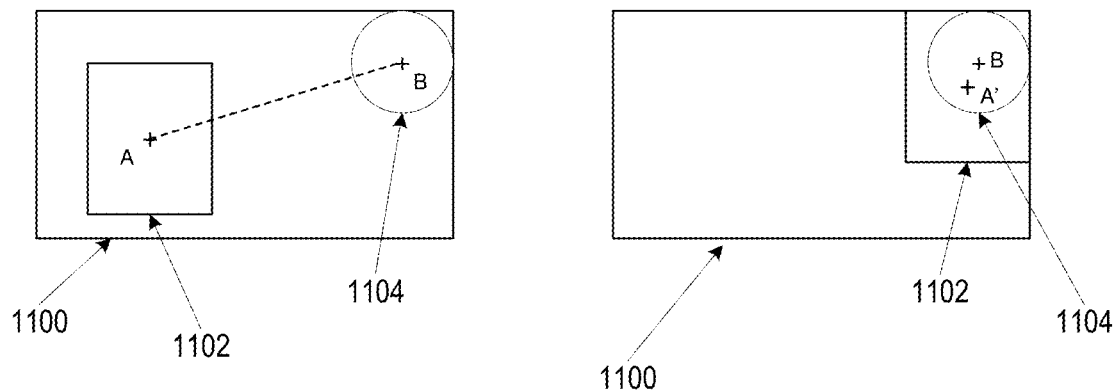
Figure 11C:
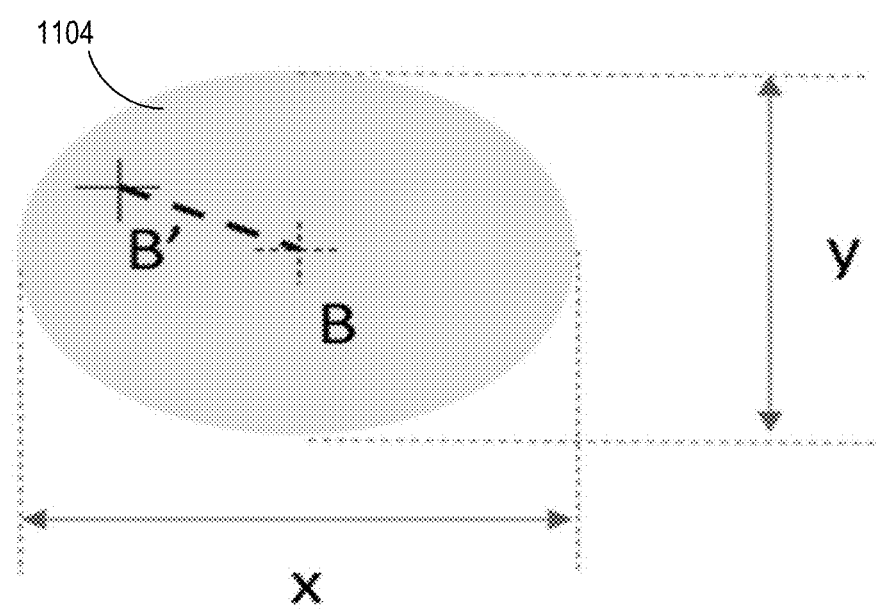

FIGS. 11A-11C depict example diagrams for providing application hotspots on an endpoint device in accordance with one or more illustrative aspects described herein. In some embodiments, adjustment of a size or location of a hotspot may include moving the hotspot to another location (e.g., a target location), such as a center of a screen of the endpoint device 720, as illustrated in FIG. 11A. As seen in FIG. 11A, the computing device displays a rectangular area representing canvas 1100 on which an image of a remote application may be rendered. The canvas 1100 may overlap with another rectangular area 1102, which represents a screen 1102 of an endpoint device. The canvas 1100 may display an image of a remote application (not shown) that includes a hotspot 1104 correspond to an element (e.g., a search bar) of the remote application. As shown in the left-hand side of FIG. 11A, the hotspot may be partially obscured from the screen 1102, such that only a portion of the hotspot 1104 may be visible from screen 1102. In a conventional system, such image of the remote application may provide a less ideal user experience when a user attempts to enter a search term in the search, because the search bar is only partially visible to the user. As a result, the user may manually adjust the position of the screen 1102 so that point A (representative of the center of the screen 1102) and point B (representative of the center of the hotspot 1104) may overlap in canvas 1100 to facilitate the user entering a search term on the search bar. In contrast, the computing device (e.g., the remote computing device 710) may receive an event (e.g., a triggering event) that the user clicks or taps on an icon that serves as a shortcut to the hotspot 1104. The computing device may move (e.g., automatically move) the hotspot 1104 to the center of the screen 1102 so that point A and point B overlap with each other at point A'. For example, the computing device may determine the dimension or size of the canvas 1100, the dimension or size of the screen 1102, and the coordinate differences between point A and point B as illustrated in steps 825-829 in FIG. 8. The computing device may determine that there is adequate space on the canvas 1100 to move point A to point B, based on the dimensions of the canvas 1100, the screen 1102 and the coordinate differences. The computing device may send information to the endpoint device to enable the endpoint device 720 to move the center of the screen 1102 to point A' so that points A' and B overlap with each other at point A' as shown on the right side of FIG. 11A.

In FIG. 11B, the computing device may determine the size of the canvas 1100, the size of the screen 1102, and the coordinate differences between point A and point B as illustrated in steps 825-829 in FIG. 8. The computing device may determine that there is not adequate space on the canvas 1100 to move point A to point B, based on the sizes or dimensions of the canvas 1100, the screen 1102 and the coordinate differences. The computing device may determine a move offset representative of a minimal distance between point A and point B. The computing device may send information to the endpoint device to enable the endpoint device 720 to move the center of the screen 1102 to point A' based on the move offset, so that points A' and B have minimal distance as reflected by the move offset.

FIG. 11C depicts example zoom in and zoom out operations on the hotspot. The computing device (e.g., the remote computing device 710) may receive an event (e.g., a triggering event) in the form of clicks or taps on the hotspot 1004 on a screen of the endpoint device 720. The computing device may determine the event corresponds to a zoom in operation. For example, a configuration table may store additional mapping information between a user gesture and an intended operation on a hotspot. A click or a tap operation on the hotspot by the user may be mapped and interpreted as a zoom in operation. The computing device may set, for example, ¼ of the screen width of the endpoint device 720 as a reference value R. The computing device may determine the smaller value of the length and width of the hotspot, such as min {x,y} as shown in FIG. 11C. According to this value, the computing device may determine that the center of the hotspot 1004 at point B is to be expanded at point B' until the min{x,y} is equal to value R. In a zoom in operation, the computing device may send information to the endpoint device to enable the endpoint device 720 to expand the center of the hotspot 1104 to point B' based on value R, so that point B is expanded to point B'. Value R may be adjusted using a factor (e.g., a scaling factor) representing, for example, ⅒, ⅕, ¼, ⅓ or ½ of the screen width based on the preference of the administrator on the scaling factor. Conversely, in a zoom out operation, the computing device may send information to the endpoint device to enable the endpoint device 720 to restore the hotspot 1004 from point B' to point B to its original size, so that point B' shrinks to point B.

Once the size or location of the hotspot is adjusted, the endpoint device 720 may continue to operate within the remote access session established with the remote computing device 710. Accordingly, the method described above may adjust (e.g., automatically adjust) a size and/or location of a hotspot within a virtual application based on a current screen or a current focus of a user, which may provide an improved user experience.

Figure 12:
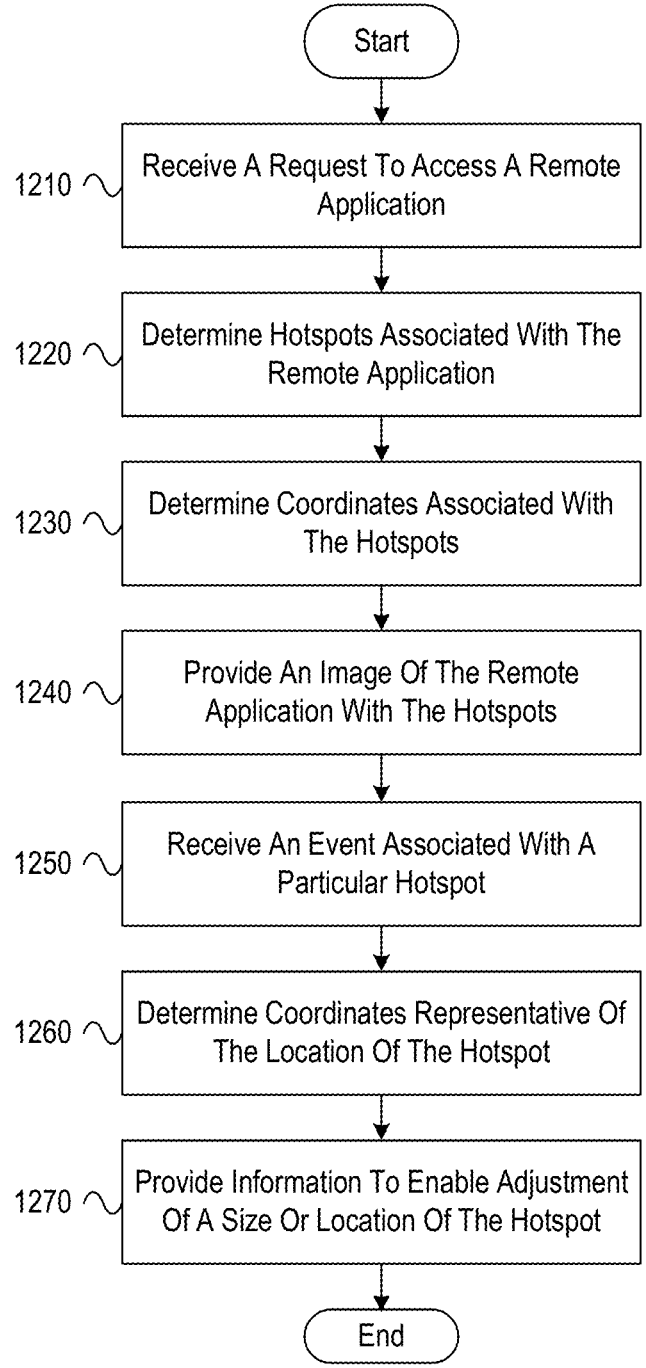
FIG. 12 depicts example method of providing application hotspots on an endpoint device in accordance with one or more illustrative aspects described herein.

FIG. 12 depicts an example method of providing application hotspots on an endpoint device in accordance with one or more illustrative aspects described herein. Referring to FIG. 12, at step 1210, a computing device having at least one processor, a communication interface, and memory may receive, from an endpoint device, a request to connect to a remote application. At step 1220, the computing device may determine one or more hotspots associated with the remote application, each hotspot corresponding to an element in the remote application. At step 1230, the computing device may determine, based on a resolution of a screen of the endpoint device, coordinates associated with the one or more hotspots. The coordinates may be representative of locations of the hotspots in a canvas on which an image of the remote application is to be rendered on the screen of the endpoint device. At step 1240, the computing device may provide the image of the remote application to the endpoint device. The image of the remote application may include the one or more hotspots displayed based on the coordinates. At step 1250, the computing device may receive an event (e.g., a triggering event) associated with a particular hotspot. For example, the event may be detected by the endpoint device and send to the computing device. The event may be caused by a user taps or clicks on an icon representing a shortcut to the hotspot (e.g., the search bar) on a floating menu bar on the endpoint device. At step 1260, the computing device may dynamically determine the coordinates representative of the location of the hotspot. At step 1270, the computing device may provide information to enable the endpoint device to adjust a size or location of the hotspot.

The following paragraphs (M1) through (M10) describe examples of methods that may be implemented in accordance with the present disclosure.

(M1) A method comprising providing, by a computing device, an endpoint device with access to a remote application, the remote application being hosted on the computing device and displayable on the endpoint device in a form of a user interface; determining, by the computing device, an adjustment to the user interface based on coordinates of a feature of user interface and a screen size of the endpoint device, the adjustment to cause display of the feature differently in at least one of a size or a location as compared with a current display of the user interface; and providing, by the computing device, data to the endpoint device to render the user interface thereon, the user interface including an element different than the feature and configured to initiate the determined adjustment to the user interface.

(M2) A method may be performed as described in paragraph (M1) wherein providing data to the endpoint device comprises providing data in response to receipt of an event comprising a zoom in operation or a zoom out operation to adjust display of the feature on the user interface.

(M3) A method may be performed as described in paragraph (M1) wherein providing data to the endpoint device comprises providing data in response to receipt of an event to change the location of the feature on the user interface.

(M4) A method may be performed as described in paragraph (M1) wherein providing data to the endpoint device comprises: determining a coordinate difference between a particular feature and a center of a screen of the endpoint device; and providing data to move the particular feature to the center of the screen based on the coordinate difference.

(M5) A method may be performed as described in paragraph (M1) wherein providing data to the endpoint device comprises: determining a first coordinate associated with a particular feature; determining a second coordinate associated with a center of a screen of the endpoint device; and after determining there is not adequate space to move the particular feature to the center of the screen, providing data to move the particular feature based on a move offset, wherein the move offset being indicative of a minimal distance between the first coordinate and the second coordinate.

(M6) A method may be performed as described in paragraph (M1) wherein the element different than the feature comprises an icon displayed on a floating menu bar, the icon representing shortcuts to initiate the adjustment to cause display of the feature.

(M7) A method may be performed as described in paragraph (M1) further comprising: prior to determining the adjustment to the user interface, registering one or more features associated with the remote application as candidates for adjustment based on a frequency of access associated with each feature.

(M8) A method may be performed as described in paragraph (M1) wherein the feature of the user interface comprises a User Interface (UI) element in the remote application.

(M9) A method may be performed as described in paragraph (M1) wherein the feature of the user interface corresponds to a specific region in the remote application.

(M10) A method may be performed as described in paragraph (M1) wherein providing data to the endpoint device comprises providing data in response to receipt of an event comprising a click operation or a tap operation to adjust display of the feature on the user interface.

The following paragraphs (A1) through (A9) describe examples of apparatuses that may be implemented in accordance with the present disclosure.

(A1) A computing device, comprising: at least one processor and memory storing computer-readable instructions that, when executed by the at least one processor, cause the computing device to: provide an endpoint device with access to a remote application, the remote application being hosted on the computing device and displayable on the endpoint device in a form of a user interface; determine an adjustment to the user interface based on coordinates of a feature of user interface and a screen size of the endpoint device, the adjustment to cause display of the feature differently in at least one of a size or location as compared with a current display of the user interface; and provide data to the endpoint device to render the user interface thereon, the user interface including an element different than the feature and configured to initiate the determined adjustment to the user interface.

(A2) The computing device as described in paragraph (A1) wherein providing data to the endpoint device comprises providing data in response to receipt of an event comprising a zoom in operation or a zoom out operation to adjust display of the feature on the user interface.

(A3) The computing device as described in paragraph (A1) wherein providing data to the endpoint device comprises providing data in response to receipt of an event to change the location of the feature on the user interface.

(A4) The computing device as described in paragraph (A1) wherein providing data to the endpoint device comprises: determining a coordinate difference between a particular feature and a center of a screen of the endpoint device; and providing data to move the particular feature to the center of the screen based on the coordinate difference.

(A5) The computing device as described in paragraph (A1) wherein providing data to the endpoint device comprises: determining a first coordinate associated with a particular feature; determining a second coordinate associated with a center of a screen of the endpoint device; and after determining there is not adequate space to move the particular feature to the center of the screen, providing data to move the particular feature based on a move offset, wherein the move offset being indicative of a minimal distance between the first coordinate and the second coordinate.

(A6) The computing device as described in paragraph (A1) wherein the element different than the feature comprises an icon displayed on a floating menu bar, the icon representing shortcuts to initiate the adjustment to cause display of the feature.

(A7) The computing device as described in paragraph (A1) wherein the memory stores additional computer-readable instructions, that when executed by the at least one processor, cause the computing device to: prior to determining the adjustment to the user interface, register one or more features associated with the remote application as candidates for adjustment based on a frequency of access associated with each feature.

(A8) The computing device as described in paragraph (A1) wherein the feature of the user interface corresponds to a User Interface (UI) element in the remote application.

(A9) The computing device as described in paragraph (A1) wherein the feature of the user interface corresponds to a specific region in the remote application.

The following paragraph (M11) describes an example of a computer-readable medium that may be implemented in accordance with the present disclosure.

(M11) A method comprising: receiving, from a computing device and by an endpoint device, data to render a remote application on the endpoint device, the remote application being hosted on the computing device and displayable on the endpoint device in a form of a user interface; detecting, by the endpoint device, an event to trigger an adjustment to cause display of a feature of the user interface, the detected event being received on an element of the user interface different than that of the feature; and modifying, by the endpoint device, the user interface of the remote application to adjust display of the feature in at least one of a size or location.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A computing device, comprising:
at least one processor; and
memory storing computer-readable instructions that, when executed by the at least one processor, cause the computing device to:
provide an endpoint device with access to a remote application, the remote application being hosted on the computing device and displayable on the endpoint device in a form of a user interface;
determine an adjustment to the user interface based on coordinates of a feature of the user interface and a screen size of the endpoint device, the adjustment to cause display of the feature differently in at least one of a size or location as compared with a current display of the user interface; and
provide data to the endpoint device to render the user interface thereon, the user interface including an element different than the feature and configured to initiate the determined adjustment to the user interface.

2. The computing device of claim 1, wherein providing data to the endpoint device comprises providing data in response to receipt of an event comprising a zoom in operation or a zoom out operation to adjust display of the feature on the user interface.

3. The computing device of claim 1, wherein providing data to the endpoint device comprises providing data in response to receipt of an event to change the location of the feature on the user interface.

4. The computing device of claim 1, wherein providing data to the endpoint device comprises:
determining a coordinate difference between a particular feature and a center of a screen of the endpoint device; and
providing data to move the particular feature to the center of the screen based on the coordinate difference.

5. The computing device of claim 1, wherein providing data to the endpoint device comprises:
determining a first coordinate associated with a particular feature;

determining a second coordinate associated with a center of a screen of the endpoint device; and after determining there is not adequate space to move the particular feature to the center of the screen, providing data to move the particular feature based on a move offset, wherein the move offset being indicative of a minimal distance between the first coordinate and the second coordinate.

6. The computing device of claim 1, wherein the element different than the feature comprises an icon displayed on a floating menu bar, the icon representing shortcuts to initiate the adjustment to cause display of the feature.

7. The computing device of claim 1, wherein the memory stores additional computer-readable instructions, that when executed by the at least one processor, cause the computing device to:

prior to determining the adjustment to the user interface, register one or more features associated with the remote application as candidates for adjustment based on a frequency of access associated with each feature.

8. The computing device of claim 1, wherein the feature of the user interface corresponds to a User Interface (UI) element in the remote application.

9. The computing device of claim 1, wherein the feature of the user interface corresponds to a specific region in the remote application.

10. A method comprising:

receiving, from a computing device and by an endpoint device, data to render a remote application on the endpoint device, the remote application being hosted on the computing device and displayable on the endpoint device in a form of a user interface;

detecting, by the endpoint device, an event to trigger an adjustment to cause display of a feature of the user interface, the detected event being received on an element of the user interface different than that of the feature; and modifying, by the endpoint device, the user interface of the remote application to adjust display of the feature in at least one of a size or location.

11. A method comprising:

providing, by a computing device, an endpoint device with access to a remote application, the remote application being hosted on the computing device and displayable on the endpoint device in a form of a user interface;

determining, by the computing device, an adjustment to the user interface based on coordinates of a feature of the user interface and a screen size of the endpoint device, the adjustment to cause display of the feature differently in at least one of a size or a location as compared with a current display of the user interface; and providing, by the computing device, data to the endpoint device to render the user interface thereon, the user interface including an element different than the feature and configured to initiate the determined adjustment to the user interface.

12. The method of claim 11, wherein providing data to the endpoint device comprises providing data in response to receipt of an event comprising a zoom in operation or a zoom out operation to adjust display of the feature on the user interface.

13. The method of claim 11, wherein providing data to the endpoint device comprises providing data in response to receipt of an event to change the location of the feature on the user interface.

14. The method of claim 1, wherein providing data to the endpoint device comprises:

determining a coordinate difference between a particular feature and a center of a screen of the endpoint device; and providing data to move the particular feature to the center of the screen based on the coordinate difference.

15. The method of claim 11, wherein providing data to the endpoint device comprises:

determining a first coordinate associated with a particular feature;

determining a second coordinate associated with a center of a screen of the endpoint device; and after determining there is not adequate space to move the particular feature to the center of the screen, providing data to move the particular feature based on a move offset, wherein the move offset being indicative of a minimal distance between the first coordinate and the second coordinate.

16. The method of claim 11, wherein the element different than the feature comprises an icon displayed on a floating menu bar, the icon representing shortcuts to initiate the adjustment to cause display of the feature.

17. The method of claim 11, further comprising:

prior to determining the adjustment to cause display of the user interface, registering one or more features associated with the remote application as candidates for adjustment based on a frequency of access associated with each feature.

18. The method of claim 11, wherein the feature of the user interface comprises a User Interface (UI) element in the remote application.

19. The method of claim 11, wherein the feature of the user interface corresponds to a specific region in the remote application.

20. The method of claim 11, wherein providing data to the endpoint device comprises providing data in response to receipt of an event comprising a click operation or a tap operation to adjust display of the feature on the user interface.

* * * * *